United States Patent
Soon-Shiong et al.

(10) Patent No.: US 11,641,354 B2
(45) Date of Patent: May 2, 2023

(54) ENHANCED ACCESS TO MEDIA, SYSTEMS AND METHODS

(71) Applicant: Nant Holdings IP, LLC, Culver City, CA (US)

(72) Inventors: Patrick Soon-Shiong, Los Angeles, CA (US); Andrew Konstantaras, Seattle, WA (US); John Wiacek, Los Angeles, CA (US); Nicholas James Witchey, Laguna Hills, CA (US)

(73) Assignee: Nant Holdings IP, LLC, Culver City, CA (US)

(*) Notice: Subject to any disclaimer, the term of this patent is extended or adjusted under 35 U.S.C. 154(b) by 0 days.

(21) Appl. No.: 17/178,924

(22) Filed: Feb. 18, 2021

(65) Prior Publication Data

US 2021/0281569 A1    Sep. 9, 2021

Related U.S. Application Data

(60) Provisional application No. 62/986,953, filed on Mar. 9, 2020.

(51) Int. Cl.
*H04L 9/40*    (2022.01)
*G06F 16/21*   (2019.01)

(52) U.S. Cl.
CPC ........... *H04L 63/10* (2013.01); *G06F 16/21* (2019.01)

(58) Field of Classification Search
CPC ... H04L 63/10; H04L 63/126; H04L 63/0807; H04L 2463/103; H04L 63/20; H04L 2463/121; H04L 63/102; G06F 16/21; G06F 16/953
See application file for complete search history.

(56) References Cited

U.S. PATENT DOCUMENTS

| | | | |
|---|---|---|---|
| 6,405,211 B1* | 6/2002 | Sokol | G06F 40/258 707/754 |
| 7,016,532 B2 | 3/2006 | Boncyk et al. | |
| 7,428,528 B1* | 9/2008 | Ferrari | G06F 16/904 |
| 9,292,509 B2* | 3/2016 | Betz | G06F 16/9535 |
| 9,576,242 B2 | 2/2017 | Soon-Shiong | |
| 9,857,964 B2 | 1/2018 | Soon-Shiong | |
| 9,860,601 B2 | 1/2018 | Soon-Shiong | |
| 10,114,925 B2 | 10/2018 | Soon-Shiong | |
| 10,133,742 B2 | 11/2018 | Soon-Shiong | |
| 10,147,038 B2 | 12/2018 | Ehsani et al. | |
| 10,346,753 B2 | 7/2019 | Soon-Shiong et al. | |

(Continued)

OTHER PUBLICATIONS

U.S. Appl. No. 62/856,917, filed Jun. 4, 2019, Soon-Shiong et al.

*Primary Examiner* — Fatoumata Traore
*Assistant Examiner* — Carlton Johnson
(74) *Attorney, Agent, or Firm* — Sheridan Ross P.C.

(57) ABSTRACT

A system and method are described. An illustrative method includes receiving content associated with a digital original work from a user device, where the associated content includes an object contained therein; determining an attribute-value pair for the content or the object contained within the content; linking the attribute-value pair to the associated content or the object contained within; determining that a second user is interested in the associated content; and causing the associated content to be transmitted to a second user device.

20 Claims, 8 Drawing Sheets

(56) References Cited

U.S. PATENT DOCUMENTS

| | | |
|---|---|---|
| 2010/0011282 A1* | 1/2010 | Dollard ................ G06F 40/169 |
| | | 715/810 |
| 2015/0039443 A1 | 2/2015 | Soon-Shiong |
| 2015/0199730 A1 | 7/2015 | Soon-Shiong |
| 2018/0189706 A1* | 7/2018 | Newhouse ....... G06Q 10/06316 |

* cited by examiner

ENHANCED ACCESS TO MEDIA, SYSTEMS AND METHODS

CROSS REFERENCE TO RELATED APPLICATION

The present application claims the benefit of and priority to U.S. Provisional Application No. 62/986,953, filed on Mar. 9, 2020, the entire disclosure of which is hereby incorporated by reference.

FIELD OF THE DISCLOSURE

Embodiments of the present disclosure relate to systems and methods for enhancing access to media by tracking content curation of original digital work by the creation of associated content and managing sharing of the associated content.

BACKGROUND

The background description includes information that may be useful in understanding the present inventive subject matter. It is not an admission that any of the information provided herein is prior art or relevant to the presently claimed invention, or that any publication specifically or implicitly referenced is prior art.

Management of digital content over time is often difficult because the digital content itself might have updates over time or might have other content that links back to the original content in a unmanaged fashion. Consider existing on-line content platforms, including digital versions of newspapers such as the LA Times or San Diego Tribune. Such platforms publish digital content and permit users to leave comments or share the content. However, the sheer volume of comments become unwieldy and such platforms lack the ability to track how content is shared or how external associated content links back to the original digital work. After an original digital work is published, viewers, users, or other digital content consumers often comment and forward links pointing to the work via social media platforms and content sharing applications. Also, the publisher may update the work or publish related work over a period of time. The new content that is created in response to the original digital work is considered "associated content". Associated content may contain corrections or updates to the original digital work, or contain additional content related to the original digital work (e.g., comments from readers of the original digital work, a prior related article in a series of articles, etc.).

A user that views an original digital work at a first point in time may not be aware that amendments to the original digital work were made at some later point in time. A digital media management server may be able to identify the associated content related to the original digital work that is not directly linked to the original digital work; track the flow of content between servers and users; and create a mapping or linked list of associated content. For example, a user may view a static version of a publisher curated article on an e-reader and is provided an updated article in a mobile application when the updated article becomes available in a dynamic virtual edition and/or through a propagation channel.

As news and information continues to be distributed via social media providers rather than through reputable news sources, the news and information can be easily altered without anyone being aware of the alteration. The unfortunate result is that misinformation spreads and people can easily fall prey to fake news or conspiracy theories due to enforced or even self-imposed filter bubbles. A digital media management server may be able to authenticate the original digital work and the associated content by incorporating authentication tokens and work tokens.

All external references are hereby incorporated by reference in their entirety whether explicitly stated or not.

SUMMARY

It is with respect to the above problems that embodiments of the present disclosure were contemplated. As an example, consider a scenario where people share an article. In general, such commentators (e.g., social media influencer, interested reader, etc.) comment and forward links to original digital works and/or associated content related to original digital works and share the comment or the forward links via social media (e.g., Facebook, Instagram, Twitter, etc.). Although this type of sharing can generate feelings of connection amongst followers of articles, this type of sharing of information fails to address meaningful issues that can have a significant impact on others in the social media network and publishing. More specifically, this type of sharing fails to address information related to curating content, ensuring accuracy of information (e.g., fake news, redistribution of inaccurate information, viewing updates to articles, etc.), combating bias, mitigating risk of generation of filter bubbles, or managing other impactful factors.

In some embodiments, users (e.g., editors, publishers, readers, consumers, etc.) of a digital media application or content sharing application are enabled to connect with each other based on a common interest in an article and associated content. This can be achieved by defining or otherwise quantifying attributes (e.g., content metadata, context of content creation, user-defined attributes, machine-defined attributes, file type, image type, etc.) and recognition features associated with an object of interest (e.g., original digital work and/or associated content, etc.). The attributes associated with the object may represent fine-grained aspects of the object (or content in which an object is contained) and allows individuals to subscribe to these aspects, or allow curators and users to curate content to be propagated to individuals having a stake in such aspects.

In some embodiments, the resulting publication event (e.g., publication of a unit of content, of an eNewsPaper edition, of a catalog, of a video, etc.), along with the digital authentication token, could be memorialized on a distributed or notarized ledger (e.g., blockchain—distributed and secure databases or digital ledger, bitcoin, Ethereum, TRON, hashgraph, IOTA, Microsoft's blockchain workbench, Hyperledger, Openchain, etc.). In some embodiments, distributed ledger technologies that are built to store data or form smart contracts possibly leveraging the Ethereum platform may be preferable. Alternatively, a permissioned ledger (e.g., where the identity of people adding blocks is known, data in the system is viewable only by selected parties, etc.) may be used to record events and digital authentication tokens. While some ledger-based technologies require some "proof" effort (e.g., proof of work, proof of storage, proof of stake, proof of majority, etc.), such proof-based ledgers are not necessarily required for the inventive subjected matter, but may be more preferable as proof-based ledgers likely provide a consumer or other users with additional confidence in the data.

The following example(s) will focus mainly on articles in an eNewsPaper application; a newspaper article for example. However, the concepts presented herein can be applied to other areas of digital content beyond articles (e.g., books, live events, movies, news, politics, games, eSports, video, televised events, radio, digital streaming, works of art, broadcasts, pod casts, vlogs, etc.).

An interesting aspect of the disclosed subject matter is that it gives rise to context-based interaction with original digital works and corresponding associated content. First, subscribers receive content that is meaningful to them as published content. Second, the context is well understood (i.e., well defined according to a namespace, ontology, etc.) so that devices presenting content or generating content can adapt their user interface to facilitate contextual interactions. To clarify this specific feature, consider scenario where an individual is at work and they wish to share an article related to the type of work being performed. When the sharing app is launched, it can present the user with context-based user interface options such as share with people working for the same company, share with people in the same industry, share with a private group of other interested users, view associated content from trade organizations, or other options. Now consider the same scenario where the person is at home (e.g., viewing articles related to hobbies, etc.). In this context, the user interface might also present the option to view content from social media platforms, but also might include a button to forward a link to the original digital work and/or associated content to friends in a contact list or friend group, while excluding coworkers.

The options for the user interface can operate in a similar manner as the propagation or subscription channels. The user device being leveraged for displaying content (e.g., cell phone, tablet, game console or device, appliance, set to box, smart TV, etc.) can include an application that has a set of user interface elements or primitives that are bound to the linked list of a set of attribute-value pairs objects for original digital works and associated content in a similar fashion as users subscribe to the channels. Such attribute-value pair objects can be considered independently manageable objects that characterize their corresponding unit of content.

In some embodiments, the system can be managed by a centralized server that maps the set of attribute-value pair objects, possibly in the form of a tuple of information stored in a tuple data structure or database, connected via a linked list to one or more propagation channels. The server can be considered as curating incoming content and contextually propagating the content as dictated according to the corresponding conditions or rules operating based on the attribute-value pairs, based on conditions applied to the attribute-value pairs, based on context, or combinations thereof. Additionally or alternatively, a user may curate the associated content of the linked list of attribute-value pairs objects for viewing and printing by the user, e.g., printing content using a user's printer.

The disclosed system provides for a rich, context-based experience that enables many additional features. In some embodiments, the data collected forms one or more training data sets that bind context (e.g., attribute-value pairs, etc.) to original digital works or associated content. Such information can be used to create or to train machine learning systems, which can then provide recommendations to one or more users based on their subscription behaviors and to provide updates to digital content of interest. Further, the data can be mined in a continuous fashion to generate suspected correlations among features of the interactions and generate hypothesis about such correlations. An example of such data mining or reasoning techniques is disclosed in U.S. Pat. No. 9,576,242 titled "Reasoning Engines Services", the entire contents of which and all other extrinsic referenced documents are hereby incorporated herein by reference.

Yet another aspect provides for instantiating the propagation channel as a nexus of information or associated content relating to original digital works. Rather than merely treating the propagation channels as a conduit of information exchange, the channel itself has value because it defines a fine-grained common point of interest. As such, users can post or retrieve information about the channel itself, possibly as triggered by the act of sharing as described in U.S. Pat. No. 9,857,964 titled "Shared Real-Time Content Editing Activated by an Image", the entire contents of which are hereby incorporated herein by reference.

Additionally, as content is shared, objects found within the digital representation of the objects can be placed on time lines or even annotated with relevant data (e.g., associated content, etc.). For example, a user may comment on an article. A backend server can store the interaction associated with the publishing the comment (e.g., linking the original article to the user comment, etc.). When others interact with the comment (e.g., at a different time, etc.) and respond to the comment, they can receive the annotated information (e.g., the original article, links to other associated content, a timeline, etc.) in a manner adapted from that described in U.S. Pat. No. 10,133,742 titled "Event Archiving, Systems and Methods", the entire contents of which are hereby incorporated herein by reference.

One aspect of the inventive technology includes a method of retrieving associate content related to original digital works. Contemplated methods allow users to access an event archive engine via one or more interfaces (e.g., cellphone, DNS via URLs, API, RESTful API, browser, social network, search engine, distributed ledger API, smart contract API, etc.). The archive engine is preferably configured to receive an original digital work and/or associated content, possibly over a network, where the content comprises data representative an occurrence in a life of an entity (e.g., an article, a movie clip, and audio clip, an eNewsPaper edition, a game, or other digital item). For example, the method can include the archive engine receiving a video of a concert captured by a user's cell phone where the video can be considered the original digital work and/or associated content related to the concert itself. The archive engine can also bind the content to a timeline associated with the entity where the timeline represents multiple associated content organized by time. Yet another step of the method includes linking associated content to other associated content relating to an original digital work, similar to the use of a memento object in U.S. Pat. No. 10,133,742. The archive engine can link the associated content with the original digital work by mapping one or more recognizable features, possibly via intermediary indexing information, of the associated content to the selected original digital work. The archive engine is capable of retrieving the selected associated content through deriving one or more derived features from a digital representation of the content and using the derived features as basis to search for the selected original digital work.

Still further, the context of an interaction provides a great deal of information about why a person is interacting with the object of interest (e.g. an article, an edition, a video, a unit of content, etc.). The reason for the interaction can be inferred by a reasoning engine as described in U.S. Pat. No. 9,576,242, the entire contents of which are hereby incorporated herein by reference, from the context and previous interactions. The reasons for the interactions can then be bound to the interaction by further attribute-value pair objects linking original digital works to associated content and presented to others as a reason for sharing similar to those methods depicted and described in U.S. Pat. No. 10,133,742, the entire contents of which are hereby incorporated herein by reference. Additionally, the intent of the post or interaction can be determined and included in an attribute or attribute-value pair of the linked list of associated content. Illustrative intent determination methods are described in U.S. patent Publication No. 2015/0120641 titled "Intent Engines, Systems and Methods", the entire contents of which are hereby incorporated herein by reference.

In a similar vein, the context associated with these interactions can provide insight into how people engage with various objects of interests or services. For example, during a viewing of a news feed or an eNewsPaper, a person might share links to articles that the person feels others would be interested in reading. These interactions represent points of engagement with respect to the viewing experience. Thus, context can provide evidence for interactions at a known engagement point or provide a definition of a possible engagement point that was previously unknown. An example of determining this type of context is described in U.S. Patent Publication No. 2015/0039443 titled "Engagement Point Management System", the entire contents of which are hereby incorporated herein by reference.

It should be appreciated that the disclosed techniques may utilize various communication methods and involve managing content routing based on context. In view that information is routed based on context and based on defined sets of attribute-value pairs created by individuals or subscribers, the system can detect when information of interest develops in an unexpected manner. For example, as discussed above with respect to machine learning in U.S. Pat. No. 9,576,242 titled "Reasoning Engine Services", the entire contents of which are hereby incorporated herein by reference, when the system discovers that a correlation might exist among various pieces of context with respect to an original digital work or with respect to a user, the system can be configured to create a new piece of content representing the suspected correlation or corresponding hypothesis. Thus, the system can be considered as sharing the newly created content or creating new associated content. In some sense, the newly created associated content can be considered a discovery. This discovery can then be annotated with a new set of attribute-value pairs as any other piece or unit of content. The discovery can then be routed to individuals having an interest in such attribute-value pairs and associated content much like the methods described in U.S. Pat. No. 10,114,925 titled "Discovery Routing Systems and Engines", the entire contents of which are hereby incorporated herein by reference.

Yet another aspect of the disclosed technology relates to mapping the interactions to sentiment. As stated above, the context of the interaction is rich in associated content that can be mapped to a sentiment state of a user. Such a state can become an attribute-value pair related to the context that is linked to an original digital work and/or associated content. Alternatively, the context can be used to derive the sentiment state of the person sharing the context (or even the sentiment state of the recipient). It should be appreciated that such sentiment state information can be used to define the propagation channel as described in U.S. Patent Publication No. US 2015/0199730 titled "Sentiment-Based Transaction Systems and Methods", the entire contents of which are hereby incorporated herein by reference.

Although the techniques described herein seek to provide more meaningful content engagement beyond subscribing via a tag; to a hash tag or via key words for example, such traditional techniques can also be used as part of the context. Still further, such tagging schemes can be augmented by treating objects as the tag itself also has value. Thus, the object of interest can be considered a visual hash tag as described in U.S. Pat. No. 9,860,601 titled "Visual Hashtags via Trending Recognition Activities, Systems and Methods", the entire contents of which are hereby incorporated herein by reference.

Many techniques can be used to automatically bind information to an object of interest. For example, computer visions techniques (e.g., SIFT, DAISY, SURF, edge detection, face detection, gaze tracking, etc.) can be used to recognize objects. Further, information about objects can be found via using salient image parameters to obtain information from a database as described in U.S. Pat. No. 7,016,532 titled "Image Capture and Identification System and Process", the entire contents of which are hereby incorporated herein by reference.

In particular, embodiments of the present disclosure provide a method that includes receiving content associated with a digital original work from a user device, where the associated content includes an object contained therein; determining an attribute-value pair for the content or the object contained within the content; linking the attribute-value pair to the associated content or the object contained within; determining that a second user is interested in the associated content; and causing the associated content to be transmitted to a second user device.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the inventive subject matter and does not pose a limitation on the scope of the inventive subject matter otherwise claimed. No language in the specification should be construed as indicating any non-claimed element essential to the practice of the inventive subject matter.

Groupings of alternative elements or embodiments of the inventive subject matter disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Various objects, features, aspects and advantages of the inventive subject matter will become more apparent from the following detailed description of preferred embodiments, along with the accompanying drawing figures in which like numerals represent like components.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as X1-Xn, Y1-Ym, and Z1-Zo, the phrase is intended to refer to a single element selected from X, Y, and Z, a combination of elements selected from the same class (e.g., X1 and X2) as well as a combination of elements selected from two or more classes (e.g., Y1 and Zo).

The term "a" or "an" entity may refer to one or more of that entity. As such, the terms "a" (or "an"), "one or more" and "at least one" can be used interchangeably herein. It is also to be noted that the terms "comprising", "including", and "having" can be used interchangeably. Also, as used in the description herein, the meaning of "in" includes "in" and "on" unless the context clearly dictates otherwise.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE DRAWINGS

The present disclosure is described in conjunction with the appended figures, which are not necessarily drawn to scale.

DETAILED DESCRIPTION

Figure 1:
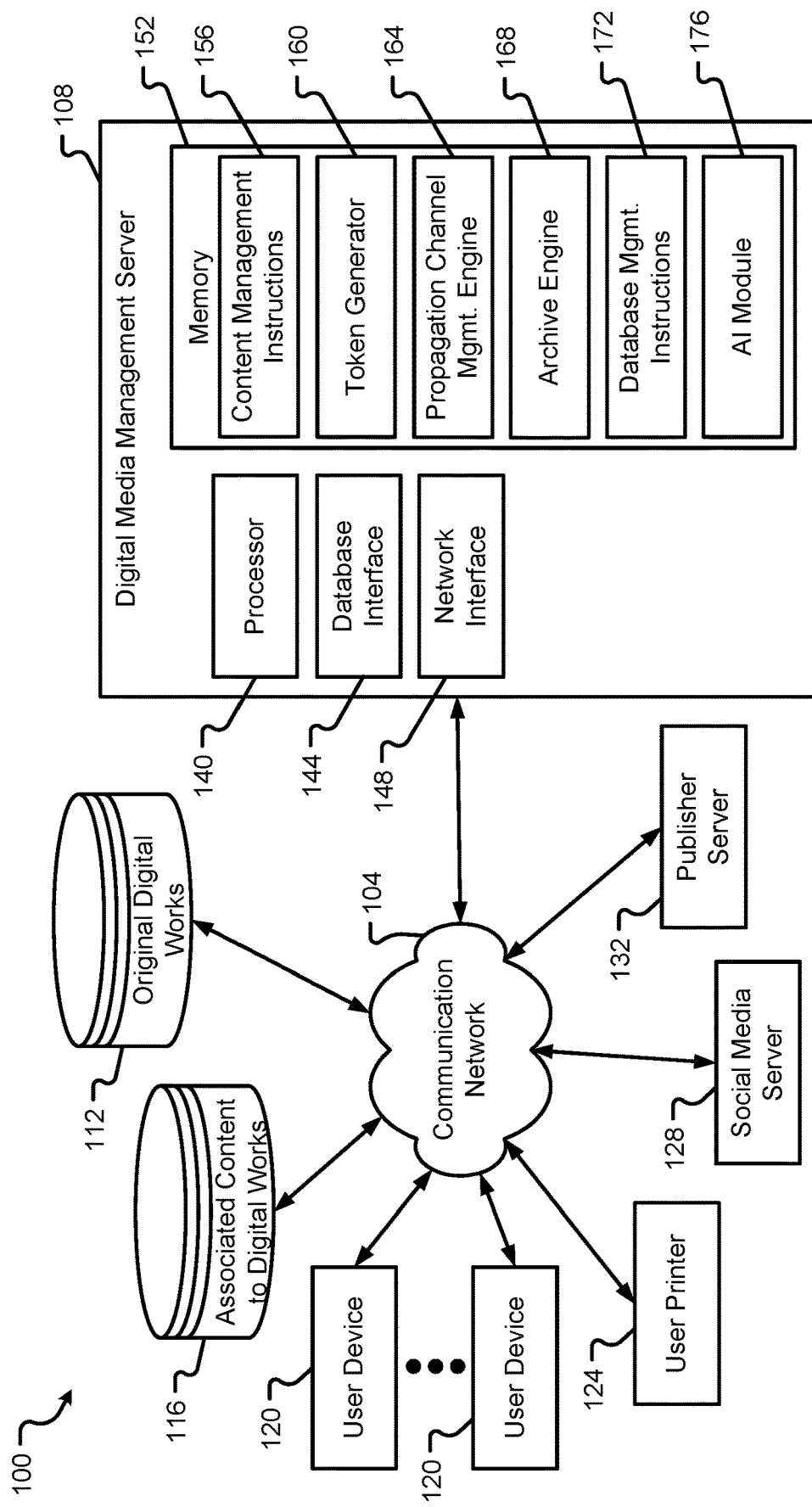
FIG. 1 is a block diagram depicting a system in accordance with at least some embodiments of the present disclosure.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

The following discussion regarding the inventive subject matter is presented within the context of an eNewsPaper. An eNewsPaper can be considered a digital form of a printed newspaper, which can be presented to subscribers on computing devices (e.g., smart phones, tablets, web browser, smart TVs, appliances, etc.). Consumers are able to maintain continuity of their status with respect to reading the editions as they move from one computing platform to another through the devices. Further, consumers are offered the ability to print editions as desired. For example, an edition could be automatically printed in the morning before the consumer wakes. Although the subject matter is presented within a context of an eNewsPaper for illustrative purposes, the disclosed techniques could also be applied toward other digital media including magazines, comic books, graphic novels, catalogs, educational content, video games, movies, technical documentation, manuals, or other types of content delivery forms.

An edition can be considered a publication of an arrangement of content. Each edition can be defined by corresponding set of rules or attributes that govern the behavior of the edition. Of specific interest, each edition can have a lifetime (e.g., a length of time, start date, end date, etc.) that determines when the edition would be active (i.e., a time when the edition may change due to appearance of associated content). After the lifetime has ended, the edition would likely no longer be active and might be locked down from further changes. While an edition is active, one or more units of content within the edition can be updated based on one or more content update rules. For example, an eNewsPaper might be published daily as a morning edition and an evening edition. The morning edition could be active from 5:00 am until 5:00 pm. The evening edition could be active for the next 12 hours. A consumer that subscribes to the eNewsPaper might gain access to or receive the morning edition on their electronic devices (e.g., cell phone, tablet, appliance, smart TV, etc.) when the morning published. As the day progresses, each unit of content in the edition could be updated, at least until the termination of morning edition's lifetime, with corresponding associated content; that is content related to an original unit of content. One should appreciate that editions might not change substantially from one edition to the next (e.g., morning vs evening, today vs tomorrow, etc.). However, it is also possible the editions change drastically from one edition to the next (e.g., May edition vs June edition, first quarter edition of the next vs subsequence quarter edition of the year, etc.).

The rules associated with an edition can be defined by an editor, publisher, or other entity that seeks to publish or otherwise release the edition. The term "editor" is used euphemistically herein to describe the entity or entities that define the content arrangement or rules for an edition. The rules that govern the edition can take on many different forms as desired by the editor. Rules can include physical arrangement content within the edition. For example, the rules could cause an edition of an eNewsPaper to mimic a physical newspaper with pages and so on where articles (i.e., units of content) are arranged on a page and rendered on computing devices. Alternatively, the content could be arranged electronically via a hierarchical arrangement similar to a web site. In some embodiments, the edition can be generated from a template having many features that are a priori defined (e.g., arrangements, attribute-value pairs, rules, timelines, etc.). The rules can also govern the life of the edition and can depend on time, which can cause the eNewsPaper to change behavior over time. As a simple example, the editor can provide instructions that cause the edition to be updated every hour during the editions active period. One should appreciate the rules can be embodied as software instructions stored in a memory that execute on a processor according to the editor's definitions. Each rule can execute upon satisfaction of an execution criteria defined based on internal edition attributes (e.g., lifetime, age, internal content keywords, edition state, etc.) or external attributes (e.g., user preferences, external feeds, user state, etc.). Thus, an edition is considered a dynamic, breathing object (i.e., digital, computer-based object) that changes during its active lifetime.

In view that an edition has temporal aspects that can be under the control of an editor, it is also contemplate that an edition could be consider continuous with respect to time. A continuous edition could be configured, at least according the edition rules defined by the editor, operate in real-time as individual rules are triggered by satisfaction of their respective criteria. For example, one or more rules of the edition could be implemented as a listener on an edition publication server. As the edition publication server observes changing conditions in the edition's attributes or other accessible attributes, the listener or listeners on server can compare the current state of attributes to criteria for currently pending rules. When the rule's criteria are satisfied, the rule is fired (i.e., executed).

While the edition's rules can govern the behavior of the overall edition, it should be appreciated the edition's rules also govern the behavior, especially updates, to the units of content within the edition. A unit of content can over a wide variety of digital content including a text-based article, an op-ed piece, a video, an image, a photograph, a logo, a graphical rendering, an advertisement, a headline, a title, an audio clip, a puzzle, a game, or other forms of digital content. When an edition is initially published or otherwise provided to consumers, an initial unit of content is considered original content as discussed further below. As time passes or circumstances change, the original content can be updated with associated content found to satisfy the rules defined by the editor. Updating original content with associated content is of particular interest with respect to the inventive subject matter.

Associated content can also take on different forms in a similar manner to the original content and can comprise one or more digital formats (e.g., text, audio, video, renderings, hyperlinks, images, etc.). Associated content is typically content that relates to the original content in some manner, but was not originally included in the edition or included with the original digital work. For example, the associated content could be considered an update to the original content (e.g., updated information, a correction, a retraction, a clarification, a data source, a footnote, an annotation, etc.). However, the associated content does not necessarily have to be related to the core nature of the original content, but could be tangentially related to the original content. More specifically, the associated content could include brand new content linked to the original content. Examples of such linked associated content could include reader comments relating to the original content, other articles that link (e.g., URL, etc.) back to the original content, content to which the original content links, or other forms of content that can be directly accessed via the original content or vice versa. Alternatively, associated content can be indirectly related to the original content due to similarity between the associated content and the original content. For example, an op-ed piece might discuss a particular political topic or current event. Other sources of content might publish content on the same political topic or current event where such content is published external to the edition. The external content can then be associated with the original content via indirect techniques. More specifically, the external content would be considered associated content when the external content satisfies a similarity criteria related to the original content. Thus, even external content lacking a direct a priori link to the original content can be "linked" back to the original content indirectly via the similarity criteria.

The similarity criteria can depend on many factors in view content can take on many different forms. To reduce the amount of computation necessary to determine one piece of content is similar to another, each piece of content can be characterized by set of quantifiable attributes based on one or more implementations recognition algorithms. Computation is reduced by characterizing each unit of content once and storing the results of the quantification as a data object in the memory of one or more computing devices. Rather than scanning content repeatedly to compare a unit of content with many others, the quantification data objects can be compared directly as described below, which reduces the amount of computer memory used when comparing content and reduces computation time. The quantification data object can include one or more attribute-value pairs in a multi-dimensional attribute namespace. The similarity criteria can depend on the distance, among other factors, between sets of attribute-values of one content and that of another. The quantification data object is referred to as an "attribute-value pair object" and is discussed further below.

With reference to FIG. 1 an illustrative system 100 will be described in accordance with at least some embodiments of the present disclosure. The system 100, in some embodiments, may include one or more computing devices operating alone or in cooperation with one another to provide data curation and mapping functions that render or otherwise generate a content-rich presentation of information, possibly in the form of an eNewsPaper. The components of the system 100 may be utilized to facilitate one, some, or all of the methods described herein or portions thereof without departing from the scope of the present disclosure. Furthermore, although particular servers are depicted as including particular components or instruction sets, it should be appreciated that embodiments of the present disclosure are not so limited. For instance, a plurality of servers may be provided with certain instruction sets depicted and described in the server of FIG. 1. Further, one should appreciate the functionality and corresponding facilities can be located in one or more computing devices. In some embodiments, the disclosed functionality may be located in a single device (e.g., a server, a computer, a mobile phone, etc.) or distributed among multiple devices; a server, a cloud infrastructure and a client device cooperating with each other, for example.

The system 100 is shown to include a communication network 104 that facilitates machine-to-machine communications between one or more of servers 108, 128, 132 and/or one or more user devices 120. The server 108 is shown as a digital media management server 108, but it should be appreciated that any type of server or collection of servers (e.g., a cloud-based system, etc.) may be provided to implement the functionality described in connection with the illustrative digital media management server 108. For example, the social media server 128, publisher server 132, and/or other server may implement a portion or all of the functionality described in connection with the digital media management server 108.

Within the context of an eNewsPaper, or other type of publishable arrangement of digital content, digital media management server 108, or other servers alone or collectively, can be considered an edition management server that supports governing the behavior of an edition according to the rules of the edition. The services offered by edition management server(s) can including construction an arrangement of content to form the edition, managing the edition over its lifetime, managing original content, managing associated content, executing other operations impacting the edition according to rules defined by one or more editors, tracking interactions or engagements of consumers with the edition, or other edition related services.

The communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over Internet Protocol (VoIP) network, a cellular network, and any other type of packet-switched or circuit-switched network known in the art. In addition, it can be appreciated that the communication network 104 need not be limited to any one network type, and instead may be comprised of a number of different networks and/or network types. Moreover, the communication network 104 may comprise a number of different communication media such as coaxial cable, copper cable/wire, fiber-optic cable, antennas for transmitting/receiving wireless messages, and combinations thereof.

The user device 120 may correspond to any type of computing resource that includes at least one processor, a non-transitory computer memory, and a user interface (e.g., a display, a keyboard, etc.). As will be discussed in further detail in FIG. 2, the user device 120 may also include one or more network interfaces that connect the user device 120 to the communication network 104 and enable the user device 120 to send/receive packets via the communication network 104. Non-limiting examples of a user device 120 include personal computers, laptops, mobile phones, smart phones, tablets, wearable devices, game devices, game consoles, appliances, kiosks, vehicles, etc. In some embodiments, the user device 120 is configured to be used by and/or carried by a user. As will be discussed in further detail herein, the user may utilize a user device 120 to submit content to the digital media management server 108 or to receive/view content provided to the digital media management server 108 by another user device 120, the social media server 128, and/or the publisher server 132. In some embodiments, rather than utilizing the digital media management server 108 to enable the sharing of content between user devices 120, the user devices 120 may be configured to directly share content with one another (e.g., via a point-to-point, direct messaging communication, social media sharing, etc.).

The digital media management server 108 may be configured to execute one or multiple different types of instruction sets in connection with receiving, storing, managing, or distributing content between user devices 120. The digital media management server 108 is shown to include a processor 140, a database interface 144, a network interface 148, and memory 152. These resources of the digital media management server 108 may enable functionality of the digital media management server 108 as will be described herein. For instance, the network interface 148 provides the digital media management server 108 with the ability to send and receive communication packets over the communication network 104. The network interface 148 may be provided as a network interface card (NIC), a wireless port, a network port, drivers for the same, and the like. Communications between the components of the digital media management server 108 and other devices connected to the communication network 104 may all flow through the network interface 148.

The social media server 128 may be configured to execute one or multiple different types of instruction sets in connection with receiving, storing, managing, and distributing content between user devices 120, republishing content provided by one or more publisher servers 132, and/or providing content to digital media management server 108. As will be discussed in further detail herein, the user may utilize a user device 120 to submit content to the social media server 128 and to receive/view content provided to the social media server 128 by another user device 120. In some embodiments, rather than utilizing the social media server 128 to enable the sharing of content between user devices 120, the user devices 120 may be configured to directly share content with one another (e.g., via a point-to-point or direct messaging communication). Additionally, or alternatively, content sharing may be enabled through one or more publisher servers 132.

The publisher server 132 may contain original digital works that are published by the publisher server 132. As such, each publisher may have one or more publisher servers 132 to distribute content according to the rules of the edition. In some embodiments, the publisher server 132 links to the original digital works database 112 and/or associated content to digital work database 116.

The processor 140 may correspond to one or many computer processing devices. For instance, the processor 140 may be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor 140 may be provided as a microprocessor, Central Processing Unit (CPU), or plurality of microprocessors, possibly having multiple cores, that are configured to execute the instructions sets stored in memory 152. Upon executing the instruction sets stored in memory 152, the processor 148 enables various functions of the digital media management server 108.

In some embodiments, the database interface 144 may be provided as a physical set of database links and drivers. Alternatively, or additionally, the database interface 144 may be provided as one or more instruction sets in memory 152 that enable the processor 140 to interact with one or more databases 112 and/or 116. As shown in FIG. 1, the digital media management server 108 may be connected with a database 112 and/or 116 via the communication network 104 or the digital media management server 108 may be connected directly with the original digital works database 112 and/or the associated content digital works database 116. The original digital works database 112 may contain content of original digital works and metadata for the content. The associated content to digital works database 116 may contain content associated with one or more original digital works. In some embodiments, databases 112 and 116 are contained in one database or other storage medium.

The memory 152 may include any type of computer memory device or collection of computer memory devices. Non-limiting examples of memory 152 include Random Access Memory (RAM), Read Only Memory (ROM), flash memory, Electronically-Erasable Programmable ROM (EEPROM), Dynamic RAM (DRAM), etc. The memory 152 may be configured to store the instruction sets depicted in addition to temporarily storing data for the processor 140 to execute various types of routines or functions. Although not depicted, the memory 152 may include instructions that enable the processor 140 to store or retrieve data from one or more databases used to store and organize content received from various user devices 120. Further still, the memory 152 may include instructions that enable the digital media management server 108 to distribute content from such databases to other user devices 120, thereby creating a so-called interaction between users of the different user devices 120.

Software instructions that govern the behavior of an edition or its content represents rules that can be created by one or more editors. Some embodiments include one or more rules development applications having an editor user interface, through which an editor is enabled to create a publishable edition. While such applications would have similar functionality to existing document publishing software (e.g., arranging content, positioning graphics, positioning text, creating pages, etc.), the contemplated rules development applications can have additional features beyond traditional published software.

The rules development application can be configured to create or otherwise manage an edition. Thus, the application would also include capacities to manage metadata that describes the nature of an edition, including all necessary attribute-value pairs describing the edition or it's sub parts (e.g., sections, pages, units of content, etc.). An editor, via the editor user interface of the application, can access the attribute-value pairs in order to create one or more rules that govern the behavior of the edition. The editor can also define new attribute-value pairs as desired. In more preferred embodiments, the attribute-value pairs adhere to an a priori defined namespace (e.g., ontology, hierarchal namespace, etc.). One should appreciate that creating behavior governing rules for an edition is distinct from other digital document publishing systems. Existing publishing system create a static document that lacks dynamics behaviors as contemplated herein. The inventors have appreciated that published content can dynamically change with time or dynamically change the consumer's relation with content as time passes. For example, an editor could create a "living" section of an eNewPaper having one or more renderable digital pages that have dynamic headlines that are updated periodically; perhaps the headlines scroll to the left as an example. Thus, the user would have a rich experience interacting with the edition and its content.

Similar to compiling a computer program, the rules development application can be configured to compile a final version of the edition along with its associated rules. The publication-ready version of the edition can comprise the original content (e.g., original digital works 112 including advertisements, puzzles, game, videos, audio, etc.) or links to the content as desired. Of particular interest, the publication-ready version of the edition can also include the behavior rules implemented by the editor in the form of software instructions. The behavior rules can be published within the digital edition object, as joint objects, or as separate objects. For example, the rules can be compiled into a serialized format (e.g., XML, JSON, YAML, etc.) for transmission to other computing devices including servers 108, 128, 132, or user devices 120. One should appreciate that the rules can include script (e.g., python, lua, ruby, perl, javascript, etc.) or compiled code (e.g., C#, Java, C, C++, etc.) that can execute on the device targeting or otherwise impacting the edition. In some embodiments, a rules agent (e.g., software instructions, program, sub-routine, etc.) is resident on a computing device and coordinates with one or more other rules agents over a network to manage execution of the rules as they are triggered. For example, user device 120 can include a rules agent that monitors local attributes associated with the user. As attributes change values or when one or more rule criterions are satisfied, the rules agent might send the information to one of the servers. The rules agent in the servers can aggregate such information and then execute the rule when all criteria are satisfied across all relevant agents.

The actions taken according to the rules are with respect to, among other things, the attribute-value pairs embedded with or otherwise bound to the published edition. The rules can be triggered by the attribute-pairs of the edition when the conditions on the device satisfy the triggering criteria. For example, if another piece of content, say associated content 116, is found to be relevant to an original digital work 112 due to a similarity measure, then the rules can cause a link to associated content 116 to be presented to the consumer within the edition.

The attribute-value pairs can have values that depend on scope, in the computer science sense, within regions or portions of an edition, and; therefore, the editions rules can operate differently depending on the scope. The scope of the rules and the attribute-value pairs can be arranged in a hierarchal fashion. For example, rules scope can be organized from the most granular (e.g., local scope, article scope, unit of content scope, etc.) to least granular (e.g., global scope, built-scope, edition-level scope, etc.). More specifically, values of attributes-value pairs at the local scope, for example at the scope of original digital work 112, might override (or take precedence) the value of the attributes at a higher level, at the section, or edition level. One should appreciate that the reverse is also possible if desired, where the rules or values of attributes at a high level scope could override (or take precedence) the values at the lower level scope. In some embodiments there could be two, three, four, or more levels of scope. An example of four levels of scope includes local scope at the individual unit of content level, page scope at the level of a group of related content (e.g., multiple units of content on a single page, etc.), a section scope at the level of a set of pages, and an edition scope covering the entire set of sections. Other levels are also contemplated such as a user preference scope, version scope covering a specific release, a brand scope covering multiple editions (e.g., the LA Times brand, the San Diego Tribune brand, etc.) that might reflect the look and feel of the brand, a volume scope that could reflect a year's collection of editions, and so on. The advantage of such an approach is clear. By providing such a scope-based overrides or precedents reduces the amount of compute time necessary to execute rules and create real-time experience for the users, because the scope rules determine most relevant rules to execute first. As an example, an edition might have an edition-level attribute-value pair referencing font size (e.g., "FontSize": "13 pt") whose value exists at an edition-level scope. However, a specific article (i.e., an original work), might have a local-scope value (e.g., "FontSize": "10 pt") that takes precedence. Thus, the more restrictive scope takes precedence and the specific article would be rendered according to the font size determined at the local scope.

The illustrative instruction sets that may be stored in memory 152 include, without limitation, a content management instruction set 156, a token generator 160, a propagation channel management engine 164, an archiving engine 168, a database management instruction set 172, and an Artificial Intelligence (AI) module 176 among others.

In some embodiments, the content management instruction set 156, when executed by the processor 140, enables the digital media management server 108 to receive, organize, and categorize all of the content provided by various user devices 120 in the system 100 and link the associated content to one or more original digital works (e.g., an edition's unit of content, etc.) and thereby forming an edition according to the rules defined by the editor. In some embodiments, the content management instruction set 156 is configured to receive one or more communications from a user device 120 representing content to be stored in a content database (e.g., the original digital works database 112, the associated content to digital works database 116, as well as other databases and/or data storage mechanism). The content management instruction set 156 may also be configured to store information associated with the received content including, without limitation, attributes associated with the content, attribute values, context associated with the content, user-defined attributes, automatically-defined attributes, scope inferred attributes or values, or combinations thereof. The information may be stored in one or many databases and the structure with which the data is stored may depend upon the type of database used. For instance, the information may be stored in a hierarchical format (for a hierarchical database), a relational format (for a relational database), in a graphical format (for a graph-based database), etc. Example databases that could be used alone or in combination include Access, Neo4j, My SQL, MongoDB, PostgreSQL, and Oracle, just to name a few. The content management instruction set 156 may also be configured to retrieve certain content when the digital media management server 108 determines that such content is to be shared with another user device 120, as described in FIGS. 6 and 7. For example, content management server 108 can retrieve content based on a query comprising one or more criterion that depend on one or more attributes and based on the rules governing the edition. Content that satisfy the query can then be shared with user device 120 as an edition. Thus, it should be appreciated in some embodiments content, objects, or other information stored in the database can be indexed by corresponding attributes, descriptors, attribute-value pairs, or other parameters sufficient to retrieve content.

In some embodiments, the content management instruction set 156, when executed by the processor 140, may enable the digital media management server 108 to receive digital content from any number of data sources and prepare such digital content for processing by other instruction sets stored in memory 152. As an example, the content management instruction set 156 may be configured to receive one or more original digital works and/or associated content to original digital works via the communication network 104 via one or more communication packets. The content received by the content management instruction set 156 may be received as a file having a predetermined format (e.g., TIFF, JPEG, GIF, PNG, BMP, AVI, FLV, WMV, MOV, MP3, MP4, WAV, WMA, HTML, etc.). Although the examples presented are audio, image, and video formats, it should be appreciated that the digital work could represent nearly any modality (e.g., text, audio, 3D scans, 3D models, 3D animations, simulations, a game, a movie, a sculpture, a person's vital signs, financial data, a book, weather information, a podcast, a vlog, JSON, XML, YAML, etc.). One should appreciate that the content is obtained or otherwise managed according to one or more rules defining an edition or other units of content. The content can be stored locally or remotely. For example, if a commercially available newspaper (e.g., LA Times, San Diego Tribune, etc.) is defining a digital edition of the newspaper, the content (e.g., op-ed pieces, photographs, advertisements, games, simulations, audio clips, video clips, stories, comics, crossword puzzles, classified ads, etc.) might all be locally stored on the newspaper's network or stored remotely on other content servers. Alternatively or additionally, the content received by the content management instruction set 156 may be received as a data stream or other type of packet-based communication. It should be appreciated that the content management instruction set 156 may include a number of different subroutines that are configured to process different types of digital content thereby enabling the digital media management server 108 to process a number of different types of digital works according the rules of the edition. In some embodiments, the content management instruction set 156 may be configured to receive original digital work from the original digital works database 112. As will be discussed in further detail herein, digital authentication or work tokens generated based on original digital works and/or associated content with the digital work may be stored by the server 108 into the database 112 and/or 116, thereby enabling the digital authentication or work tokens to be made accessible for use in connection with authorized publications of original digital works from the original digital works database 112. While depicted as separate databases, it should be appreciated that original digital works database 112 and the associated content to digital works database 116 can be stored in the same database without departing from the scope of the present disclosure.

Figure 3:
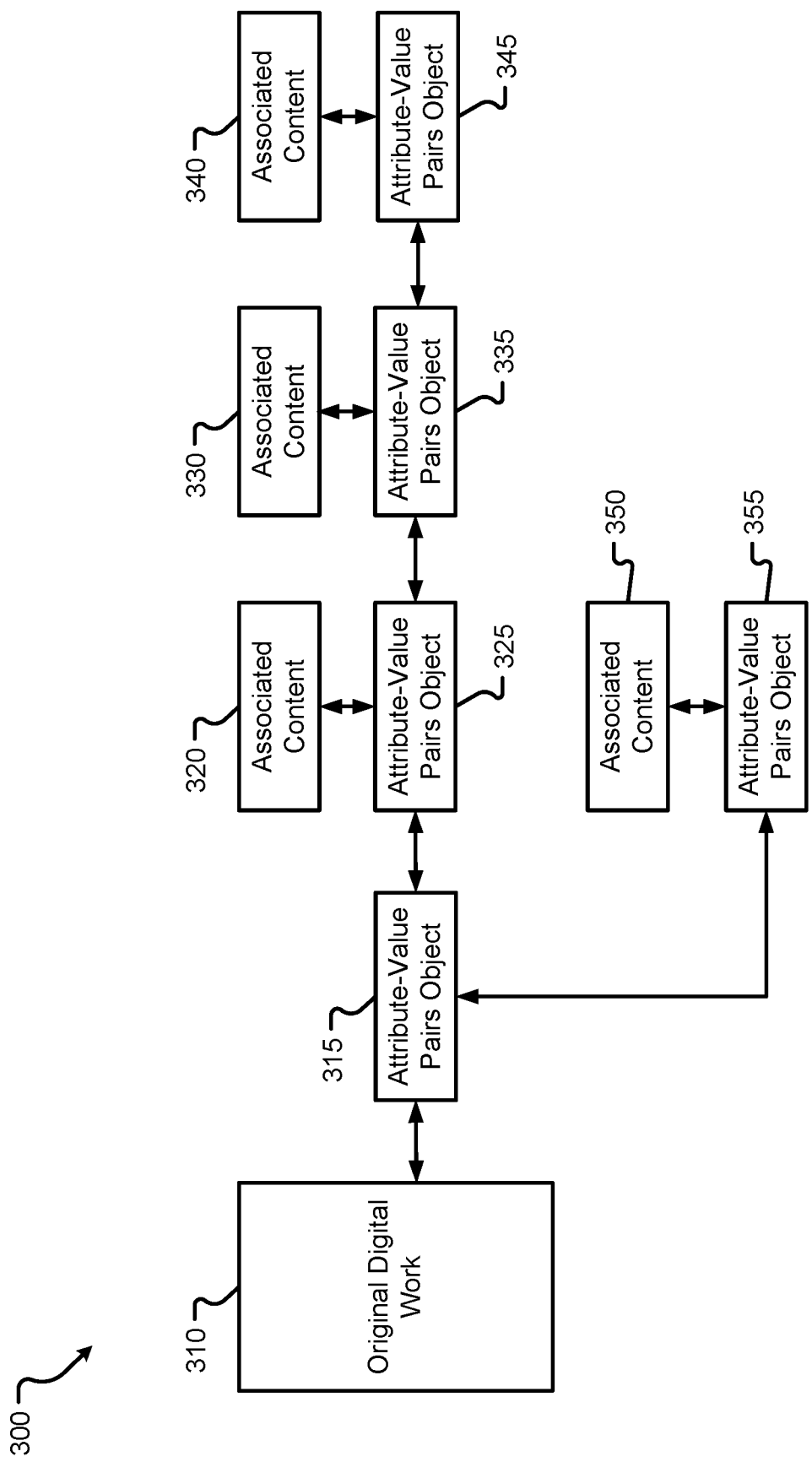
FIG. 3 is a block diagram of linking original digital work to associated content in accordance with at least some embodiments of the present disclosure.
Figure 4:
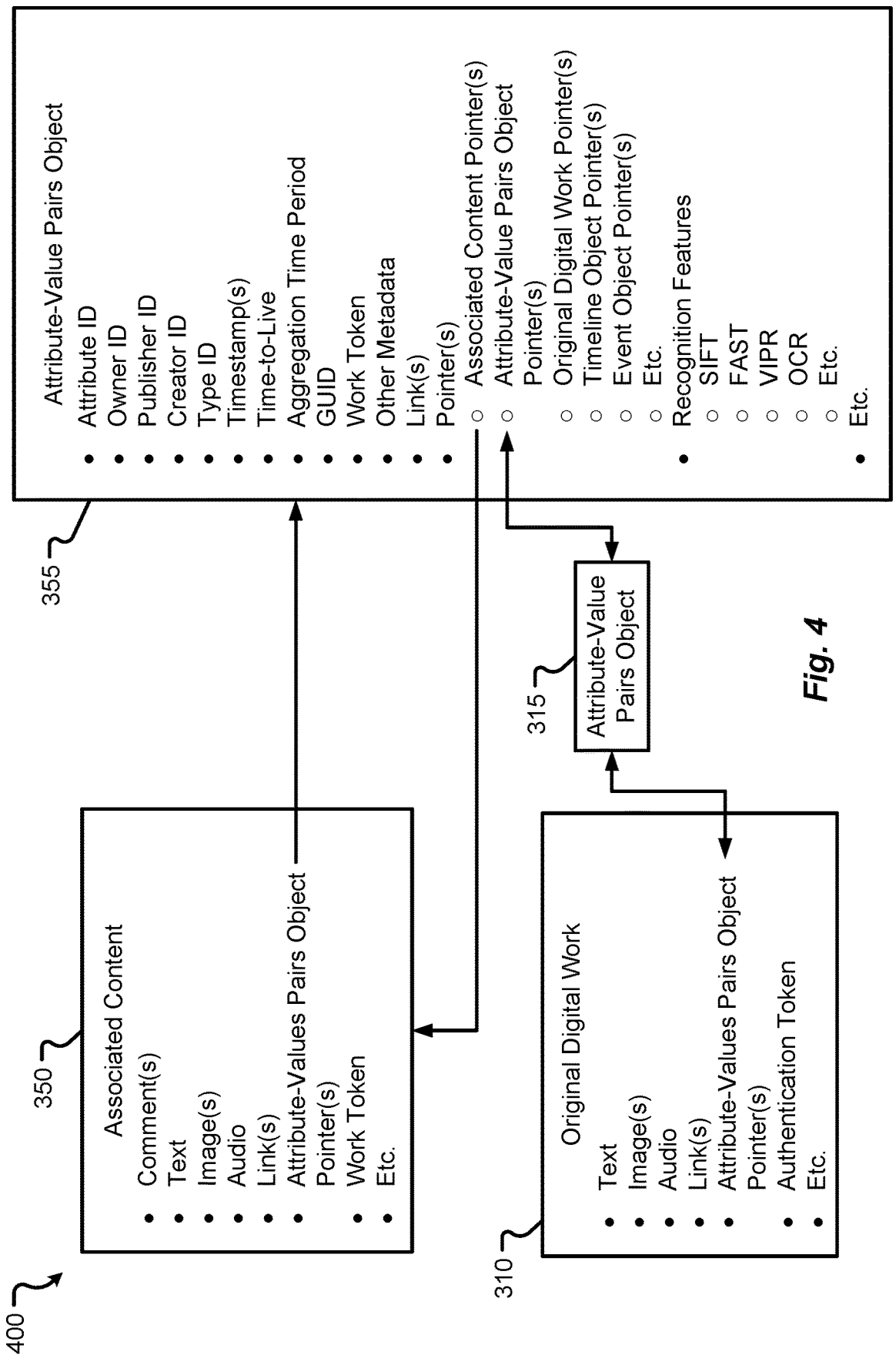
FIG. 4 is a detailed block diagram of linking original digital work to associated content in accordance with at least some embodiments of the present disclosure.

Digital authentication tokens or work tokens generated by the token generator 160 may be stored original digital work database 112 (e.g., original digital work 310, as shown in FIGS. 3 and 4), in associated content to digital works 116 (e.g., associated content 320, 330, 340, and 350, as shown in FIGS. 3 and 4), and/or attribute-value pairs objects (e.g., attribute-value pairs object 315, 325, 335, 345, and 355, as shown in FIGS. 3 and 4). Digital authentication tokens may provide an integrity check or digital signature to allow a user to verify the source of the original digital work and/or associate content (e.g., the article was original published by Reuters, etc.). Example digital authentication tokens can be found in co-owned U.S. provisional application 62/856,917 titled "DNA-Based Authentication and Validation of Digital Content" filed on Jun. 4, 2019, and in corresponding co-owned utility application Ser. No. 16/891,364 titled "Content Authentication and Validation via Multi-Factor Digital Tokens, Systems, and Methods", filed on Jun. 3, 2020, which are incorporated by reference in their entirety. One aspect of the inventive subject matter is considered to include such tokens within an edition or across editions at various levels of scope. For example, each unit of content can also include a token. Further, higher levels of content (e.g., page level, section level, edition level, version level, etc.) can also include tokens that are generated based on the lower level tokens. Thus, an edition could be published with an edition level token that essentially represents a token capable of being used to validate or authenticate all content within the edition. This approach provides for a token tree (e.g., hierarchal content structure having tokens at each node, etc.). In some embodiments, the edition comprises a token Merkle tree (for more information regarding a Merkle tree see URL en.wikipeidia.org/wiki/Merkle_tree). This approach is considered advantageous because is permits efficient generation or use of validation tokens for an entire edition when only one portion of the content changes. Thus, an edition itself can be considered a self-contained notarized ledger.

In some embodiments, the publication of original digital works and associated content, along with the digital authentication tokens and work tokens, could be memorialized on an external ledger such as a distributed or notarized ledger (e.g., bitcoin, Ethereum, TRON, hashgraph, IOTA, Microsoft's blockchain workbench, Hyperledger, Openchain, directed graphs, etc.). In some embodiments, distributed ledger technologies that are built to store data or form smart contracts such as Ethereum may be preferable. For example, editions that have rules that cooperate with enteral third parties (e.g., advertisers, public submissions, government agencies, etc.), which can be embodied within a smart contract governing the interaction. As the third party fulfills their side of the contract (e.g., pay fees, complete a story, provide submission, etc.), the edition can take reciprocal action (e.g., incorporate advertisement, incorporate notices, etc.). Such smart contracts can be coded in Solidity, the Ethereum smart contract coding language. Thus, one aspect of the inventive subject matter is considered to include editions having attribute-value pairs or rules that interact with smart contracts, possibly via one or more APIs. It should be appreciated that certain embodiments of the present disclosure contemplate use of many different types of ledgers, whether distributed or not. For instance, embodiments of the present disclosure contemplate use of a private, centralized, or semi-private ledger. In other words, the ledger containing information that describes original digital works and associated content does not necessarily need to be a distributed ledger (i.e., distributed among disparate computers lacking a single manager) in the strictest sense, but rather could be stored on computers controlled by a single entity or a close knit group (e.g., consortium, partners, etc.) of entities.

The propagation channel management engine 164, when executed by the processor 140, enable the digital media management server 108 to control the distribution of content to user devices 120 via one or more communication channels. Examples of the propagation channels that may be controlled and managed by the propagation channel management engine 164 include, without limitation, text-based communication channels, video communication channels, audio communication channels, multimedia communication channels, alerting channels, web-based communication channels, combinations thereof, and the like. In some embodiments, the propagation channel management engine 164 may be configured to cooperate with the content management instructions to determine whether newly-added associated content (e.g., content provided by a user of a user device 120) should be propagated to other user devices 120 of other users based on a representation of the content or an object contained in the content within the linked list of attribute-value pair objects. In other words, a propagation channel may be selected for purposes of distributing/propagating content to user devices 120 (based on their association with a user having a user account and defined attribute-value pairs linking associated content with other associated content and/or original digital works) and the propagation channel(s) selected may be selected based on the mapping of the propagation channel within a linked list of attribute-value pairs objects. Thus, propagation channel management engine 164 can be leveraged to publish an edition and coordinate communications among the various computing devices that may interact with the published edition. For example, when an edition is ready for publication, propagation channel management engine 164 can transmit the edition, original digital works, or rules and attributes for the edition to each subscribing device. Each subscribing device or consumer can then, if necessary, obtain units of content related to the edition from other devices in the ecosystem according the editions rules. Such an approach provides several technical advantages. First, the edition rules can dictate priority, urgency, or other delivery criteria. Content can be propagated according to the rules to conserve bandwidth or manage latency. Subscribers who pay more could receive prioritized delivery. Alternatively, subscribers who are authorized to receive important information (e.g., emergency alerts, critical article updates, published research papers, etc.), could be prioritized. Second, part of the rules functioning based on attribute-value pairs can further dictate breadth of content to be distributed to consumers, which further restricts or otherwise manages control over bandwidth. Aspects with propagation and attribute-value pairs will be further discussed in connection with FIGS. 3 and 4.

In addition to managing the receipt and distribution of content (e.g., the media, original content, associated content, etc.) on a propagation channel, the propagation channel management engine 164 may also be configured to manage hardware components of the digital media management server 108 used to establish a communication link over the communication network 104. For instance, the propagation channel management engine 164 may be configured to allocate network ports, port addresses, IP addresses, and/or bandwidth on a communication channel to enable the transmission of content to a user device 120. Once the content has been transmitted to the user device 120, the propagation channel management engine 164 may relinquish the previously-allocated resources back to the digital media management server 108 for use in connection with transmitting other content to another user device 120.

In view that collections of editions, individual editions, original content, associated content, or other portions of an edition are considered living and dynamic objects that can change within their lifetimes, one should appreciate keeping track of such changes for archival purposes can be quite useful. Just as traditional newspapers, magazines, or other periodicals keep archive copies for posterity or for future research purposes, digital editions can be archived. However, digital editions comprise a rich digital feature space (e.g., digital audio, digital video, digital images, text, games, executable code, etc.), which can be used to archive editions or content to be retrieved at a later time. For example, photographs (e.g., a type of original digital work, a type of associated content, etc.) can be analyzed via one or more implementations of image analysis algorithms (e.g., SURF, SIFT, DAISY, HoG, etc.) to generate image descriptors. Implementations of such algorithms can be obtained via OpenCV (see URL opencv.org among other locations). An edition having such a photograph can be indexed by or associated with such its image descriptors. When an entity wishes to search for editions (or content) having photos that are similar to a query image, the query image can be analyzed by the implementation of similar algorithms and an archive engine can then use the resulting query image descriptors as a query to look up editions having similar images.

Each edition or portion of an edition (e.g., unit of content, original content, associated content, section, page, etc.) can have a timeline associated with it that is commensurate with its lifetime and that operates based on the rules governing the behavior of the edition. The timeline also can be considered a data object, which can be a compiled as set of changes to the unit of content where each change or delta has a timestamp. Alternatively, or additional, the timeline could be associated with an aggregated set of content (e.g., an edition, a volume, etc.) where the timeline takes on a similar structure to the aggregated set (e.g., tree, hierarchal, etc.) and the changes are stored in the similar structure according to timestamps. It some embodiments, a timeline will have a start point in time and an end point (if one exists) in time. Thus, the timeline could be considered a discrete object that could exists external or separate from the edition if desired. Providing timelines allows an entity, possibly the consumer, to observe an edition at any point in its lifetime to see how the edition change as a function of its rules, especially based on its time-based rules. In some embodiments, an edition has a social media timeline where changes to the edition (e.g., changes to original digital works, changes to associated content, comments, etc.) are posted on the social media timeline. Thus, the inventive subject matter is considered to include creating or otherwise managing a social media account for a published edition and presenting changes to the edition on the timeline of the social media account.

There is a broad spectrum of changes or updates that can be bound to a timeline. Changes bound to the timeline can include updates to the original content, corrections, associated content that is linked to the original content, comments provided by consumers, content linked to the original content by a consumer, or other types of updates to the edition. As changes or updates are identified, they can be incorporated or otherwise linked to the timeline according to applicable rules. For example, in some embodiments, the associated content representing changes or updates can be directly incorporated into the edition along with a corresponding timestamp, while in other embodiments the associate content can be linked (e.g., via URL, via file names, etc.) to the corresponding original content and where the link includes a timestamp associated with the update.

The combination of timelines and archiving editions provides for interesting and more rich consumer experiences. Rather than the consumer interacting with a static edition as with traditional newspapers or websites, the consumer can interact with the edition via time-shifting controls. Thus, the edition can be visualized via a rendering application (e.g., dedicated eNewsPaper app, browser, graphics software, video game, etc.) that permit the consumer to display the edition as it would appear at any point during the edition's lifetime. This is a significant difference from a website that merely displays comments from a static article because the consumer can see when, during the lifetime, associated content appeared or was removed. The rendering application can include one or more time shifting controls (e.g., a sliding bar, forward, reverse, play, pause, etc.) that permits the consumer to rendering the edition dynamically.

Although an editions timeline can be archived, one should also appreciate that a consumer's interactions with an edition or with content that could impact the edition (e.g., linking to associated content, commenting on original works, etc.) can also be archived as a timeline. Thus, part of the inventive subject matter is considered to include creating or otherwise managing consumer timelines based on interactions with an edition. The consumer timelines can be stored as part of an edition, as part of an instance of the edition on consumer devices, as a separate object, or even via an external timeline (e.g., social media timeline, etc.).

The archive engine 168 may be configured to receive an original digital work and/or associated content, possibly over a network, where the content comprises data representative an occurrence in a life of a published entity (e.g., an edition, an article, a movie clip, and audio clip, or other digital item, etc.), as described above. The archive engine 168 can also bind the content to a timeline associated with the entity where the timeline represents multiple associated content organized by time. The archive engine 168 can link the associated content with the original digital work by mapping one or more recognizable features, possibly via intermediary indexing information, according to one or more similarity measures, of the associated content to the selected original digital work. The archive engine 168 is capable of retrieving the selected associated content through deriving one or more derived features from a digital representation of the content and using the derived features as basis to search for the selected original digital work. As discussed previously, the archive engine 168 can be configured to leverage a query having one or more of the recognizable features (e.g., image descriptors, keywords, hashtags, derived utterances, metadata, etc.) to retrieve content that has been indexed according to such features.

The archive engine 168 can recognize the references and/or links to original digital works and associated content or recently received content by the digital media management server 108, and determine if the recently received content is an original digital work having its own timeline, part of an edition having a timeline, and/or associated content linked to another timeline. If so, assuming authorization to link, then the archiving engine 168 can link or bind the content to one or more timelines.

The archive engine 168 may also cause the publication of the publishable content (e.g., original digital works and/or associated content) to be recorded on a distributed or notarized ledger. Further archive engine 168 can record timeline objects, timelines, or actions associated with timelines on the distributed or notarized ledger. Recordation of the publication event may include updating the distributed or notarized ledger (e.g., Openchain, Hyperledger, Ethereum, bitcoin, hashgraph, IOTA, TRON, etc.) with information about the publication, information about the original digital work and/or associated content, timeline information, information about the digital authentication token or work token, linking the information to an entry in the ledger that has already been verified by a participant to the distributed ledger, timestamping the distributed ledger with a date of the publication or a date on which the original digital work and/or associated content was produced, or combinations thereof.

Given the vast volumes of data recorded along with each edition, the data can be mined for many different purposes. For example, the data can be mined to predict performance of an edition in the market, how consumers might or might not engage with the content, to determine possible associated content of interest to a consumer, or other purposes. Such purposes can be achieved through use of one or more machine learning techniques including classification algorithms (e.g., SVM, random forests, neural networks, k-nearest neighbor, decision trees, etc.), regression algorithms (e.g., linear regression, principle component analysis, long short-term memory NNs, lasso regression, ridge regression, ElasticNet regression, etc.), clustering algorithms (e.g., k-mean clustering, spectral clustering, etc.), or other types of machine learning algorithms. Implementations of many such machine learning algorithms are available via sci-kit learn (see URL scikit-learn.org/stable).

The recorded or stored data associated with editions comprise a rich feature set as discussed previously where each unit of content can be characterized by attribute-value pairs that exist in a well-defined namespace as well as, or in addition to, specific values (e.g., timestamps, locations, etc.). Further, the namespaces can be open ended to permit adding additional attributes or dimensionality to accommodate future machine learning needs. Thus, it is possible to create machine learning training data sets having a desired set of characteristics at various levels of granularity. For example, the training data sets can include data extracted at the edition level (e.g., high level) down to individual the unit of content level (e.g. low level) as desired. The complete archived data can be made available, possibly according to a fee schedule, to consumers wishing to delve into the data, to advertisers, researchers, or others.

The attribute-value pair objects preferably include attributes that adhere to a well-defined namespace as referenced above. However, in view that such namespaces can change with time, if desired, or that content might change, it is contemplated that attribute-value pair objects might need to be recompiled. Reprocessing of attributes associated with a unit of content (or other portions of an edition) can be triggered through various techniques. In some embodiments, only active editions are reprocessed. Still, non-active editions could be reprocessed upon a suitable trigger (e.g., detected access, request from user, etc.). Yet further, reprocessing could be triggered by one or more computing devices (e.g., the servers, etc.) detecting a significant change to the well-define namespace; a threshold number of attributes changed, added, or discovered; a critical or required attribute changed; an addition or update to an implementation of a recognition algorithm; or other changes.

In some embodiments, access to the archived data can be provided via a research interface through which researches can build desirable machine learning training sets. For example, a researcher can pay a subscription fee to access the archived data via a web browser that offers a search or database query interface. The interface can display available searchable fields, possibly in the form of a hierarchical tree structure that represents the well-define namespace or other searchable features (e.g., keywords, images, locations, time, etc.). Examples of searchable fields can include image descriptors, utterances from audio, time, location, consumer attributes or demographics, or content classification (e.g., genre, topic, etc.) just to name a few. Training data sets can be built to include actions taken by consumers (e.g., timeline data, etc.), actions taken by editors, interactions between original content and corresponding associated content, linkages among various content, or other aspects of the data as the researcher desired.

One interesting use for building training data sets centers is generating "what if" scenarios. An editor could construct one or more trained machine learning models based on the archived data. Such models can provide predictions on how editions might be used by a population of consumers, for example. As the editor is building a new edition, the new edition can be submitted to the trained machine learning models or ensemble of models to generate predictions of how the new edition might perform. Such approach permits the editor to change the edition based on the prediction to improve one or more predicted performance metrics (e.g., time on content, number of comments generated, number of shares, revenue generated, subscriptions gained, etc.).

Yet another interesting use of these AI techniques includes identification of filter bubbles or bias. This particular use focuses on one or more specific consumers, or a tight knit group of consumers. As the consumers interact with specific content, their behaviors can be tracked relative the nature of the content (e.g., classification, genre, topic, sentiment, bias, etc.). If the aggregated content forms a cluster around a specific topic, then the consumers might be a victim of a self-imposed filter bubble or bias. In some embodiments, the cluster can be found using clustering techniques as mentioned previously (e.g., k-means clustering, etc.) and possibly in conjunction with Word2Vec (see URL en.wikipedia/wiki/Word2vec) or Doc2Vec. To combat such filter bubbles or bias, rather than the models identifying content that is similar, models can be trained to find content that is estimated to be opposing content reflecting an opposing point of view, opposing assertions, or opposing bias. Such content can then be provided to the consumer, preferably upon verification the opposing content is valid or is a fact. One contemplated approach is to include opposing attribute-value pairs. For example, an attribute-value pair for a unit of content might be {"PoliticalAffiliation": "Republican"} and the opposing attribute value pair might be {"PolliticalAffiliation": "Democrat" }. While this approach is illustrated as two attribute-value pairs, each having a single value, the information could also be represented as a single attribute with a compound value:

{"PoliticalAffiliation":
   "Value":"Republican",
   "OppositeValue":"Democrat"
}

The multi-valued approach is advantageous because a unit of content can provide insight into its opposite without requiring the system to manage an "opposites" database. Thus, the inventive subject matter is also considered to include namespaces that carry opposite information. Such an approach could also be under control of consumer if desired. The consumer might select a ratio of content to be recommend or presented where the ratio governs how many articles are provided with an opposing viewpoint; 10 to 1, 100 to 1, etc. In which case, the consumer might be presented one opposing unit of content for every 10 or 100 units of content that aligns with their views. Access to such a feature could also be based on a fee.

The AI module 176, when executed by the processor 140, may enable the digital media management server 108 to discover new attributes, identify patterns (or irregularities) in data structures managed by the digital media management server 108, link associated content with the original digital work being referenced, and perform other machine learning tasks on any type of data managed by the digital media management server 108 or other servers and devices in the ecosystem. For example, attribute-value pairs and user interactions with corresponding content can be used to compile an AI training data set. Such AI training data sets can then be used to train one or more neural networks. The trained neural networks, alone or in combination, can then be used to predict a user's interest or likelihood of interacting with new content based on the new content's attribute-value pairs. Of particular interest, such machine learning techniques can be leveraged with respect to changes in the original content. Identifying which changed features would likely be of interest to a user serves multiple purposes. First, authentic changes to the content can be propagated to the user. Second, non-authentic changes to the content (e.g., misinformation, content out of context, etc.) can be flagged as such even though it might be of interest to the user or can be prevented from being routed to the user. The latter approach has the technical advantage of filtering data, which prevents establishment or persistence of filter bubbles or bias as alluded to above.

Figure 2:
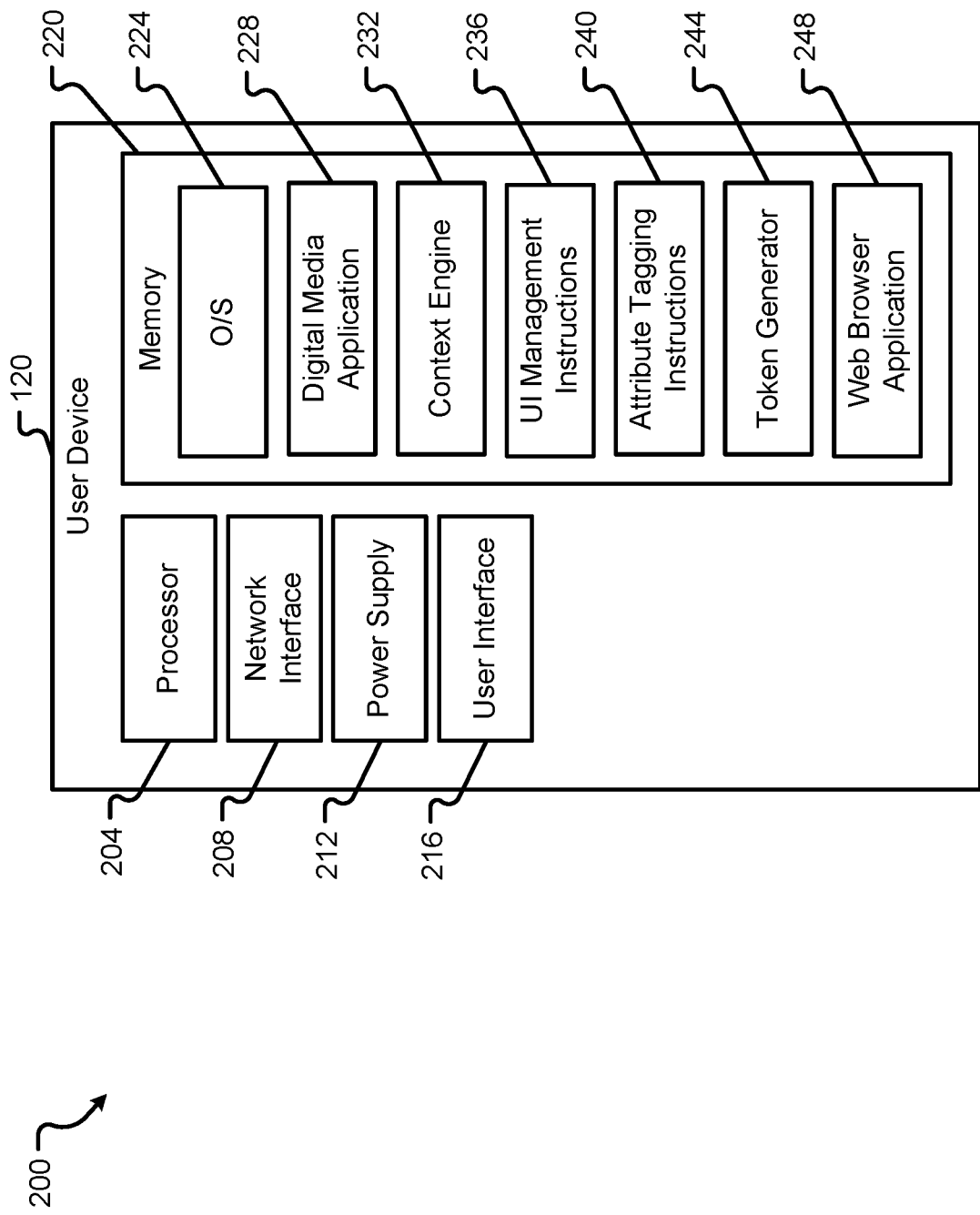
FIG. 2 is a block diagram depicting a user device in accordance with at least some embodiments of the present disclosure.

With reference now to FIG. 2, additional details of a user device 120 will be described in accordance with at least some embodiments of the present disclosure. A user device 120 may correspond to one or multiple devices that are associated with and, in some instances, used by a user or other consumer having a user account with the digital media management server 108. In some embodiments, the user device 120 may correspond to a particular device that is recognized by the digital media management server 108 as being associated with a consumer having a user account registered with the digital media management server 108. In some embodiments, the user device 120 may include one or more instruction sets that enable a frictionless, secure, and efficient interaction between the digital media management server 108 and the user device 120.

The user device 120 as shown includes a processor 204, a network interface 208, a power supply 212, a user interface 216, and computer memory 220. The processor 204 may correspond to one or multiple processing circuits. In some embodiments, the processor 204 may include a microprocessor, multi-core processor, an Integrated Circuit (IC) chip, FPGA, an ASIC, or the like. The processor 204 may be configured with a plurality of logic circuits or circuit elements that enable the processor 204 to execute one or more instructions or instruction sets maintained in memory 220. Alternatively, or additionally, the processor 204 may be configured to execute instructions for operating the network interface 208 and/or user interface 216. As an example, the processor 204 may be configured to execute one or more drivers that are specifically provided for the network interface 208 and/or the user interface 216.

The memory 220 may be in communication with the processor 204. The memory 220 may include any type or combination of computer memory devices. Non-limiting examples of memory 220 include flash memory, volatile memory, non-volatile memory, RAM, NVRAM, SRAM, ROM, EEPROM, SSD, HDD, etc. As can be appreciated, the types of devices used for memory 220 may depend upon the nature and type of data stored in memory 220.

In the depicted embodiment, the memory 220 includes one or a plurality of finite/closed-ended instruction sets that are executable by the processor 204. Non-limiting examples of instruction sets that may be provided in memory 220 include an operating system (O/S) 224, a digital media application 228, a context engine 232, a User Interface (UI) management instruction set 236, an attribute tagging instruction set 240, a token generator 244, and a web browser application 248.

A user of the device 120 may be enabled to access and utilize the various instructions 228, 232, 236, 240, via use of the O/S 224. Examples of an O/S 224 include Apple iOS, Android OS, Blackberry OS, Windows OS, Palm OS, Open WebOS, Linux, etc. In some embodiments, the O/S 224 provides a display of icons that are presented via the user interface 216. Some or all of the icons may be selectable by the user of the user device 120 to access routines or features provided by instructions 228, 232, 236, 240, 244, 248. In some embodiments, each discrete set of instructions (e.g., the digital media application 228) has a specific icon associated therewith that is presented via a home screen of the O/S 224. When that specific icon is selected by a user, the user interface 216 may present specific data and graphics associated with the application; an eNewsPaper app presenting one or more editions for example.

The digital media application 228 may correspond to one or many different applications or instruction sets that enable the user device 120 to interact with the digital media management server 108, especially with respect to published editions, as well as the social media server 128, and/or the publisher server 132, in a secure and efficient manner. The digital media application 228 may be a web browser application, such as web browser 248 that supports web-based content and technologies (e.g., HTTP, HTTPS, etc.). In some embodiments, the digital media application 228 may utilize one or more mutually-agreed-upon communication protocols to facilitate communications with the digital media management server 108. The digital media application 228 may also operate in cooperation with the UI management instruction set 236 to present information/content received from the digital media management server 108 via the user interface 216 in a predetermined manner, preferably to present an edition's arrangement of content according to the edition's rules. For instance, the digital media application 228 may utilize the UI management instruction set 236 to determine window sizes and aspect ratios to be used when presenting information and content received from the digital media management server 108. The digital media application 228 may also provide a portal for a user to define further attributes of interest, to share content/transmit content to the digital media management server 108 for sharing with other user devices 120, to view content shared by other user devices 120, to manage user settings (e.g., subscription settings, security settings, profile information, etc.), and perform other tasks in connection with managing a user's account at the digital media management server 108.

Consumers can interact with editions under many different circumstances. Detection of the consumer's circumstantial context provides opportunities to enrich the consumer's experience further. An edition's rules can comprise context rules that govern how the edition should behave for the consumer based on a detected consumer's context.

A consumer context can be defined based on one or more of a consumer's attributes, which could overlap or be part of with an edition's attribute space. Each context can have a human understandable name or label for ease of understanding and that describes the nature of the context. When the context is detected, the rules that depend on the consumer's context can be triggered or executed by user device 120, digital media application 228, or other execution facility in the ecosystem. Example contexts could include "work" or "home". A "work" context could be defined by a consumer's location (e.g., GPS location, IP address, wireless triangulation, etc.) indicating presence at a work locale, where the edition is rendered according to the context rules; perhaps prioritizing an edition's business sections over home living sections. A "home" context could also be defined by the consumer's location when the consumer is located proximate or within their home. Under the home context, the edition might prioritize a comic section or leisure sections over business sections. In a similar vein, time can be used to aid in determining the context. For example, if the consumer is located at work but on the weekend, the context might shift from "work" to "weekend-work". The impact on the edition might further cause the edition to rearrange the context, possibly by prioritizing classified and business sections. Consider a more specific example where a consumer has subscriptions to multiple eNewsPapers, say digital versions of the LA Times® Newspaper and the San Diego Tribune® Newspaper. As the consumer travels around Southern California, digital media application 228, or other edition rendering facility, can use the consumer's location or direction of travel to determine which newspaper to present first. If the consumer is closer to Los Angeles than San Diego, then the LA Times newspaper can be prioritized. Naturally, the opposite can also be programmed into the rules of the editions.

Yet another example use of consumer context includes determining context based on consumer attributes that represent the consumer's demographics, psychographics, or other characteristics. As a simple example, the consumer's age could be used to determine a context such as "child", "young adult", "adult", "senior", or other age-based context. Thus, the rules for the edition can then cause the edition to be rendered based on the age-based content. Perhaps the young adult version of the edition includes the same content as the base edition, but selects easier to understand vocabulary, while a senior edition might be rendered using larger fonts for easier reading.

In view that age, location, time, movement, or where consumer attributes can be used alone or in any combination to define a context, one should appreciate that multiple contexts could validate at a time. In such cases, especially in cases where contexts might be contradictory (e.g., "senior" edition context is valid but user preference is set to "young adult", etc.), the rules for the edition can be used to rank or order contexts based on one or more factors, possibly based on user preferences as the example indicates.

From yet another perspective, context could also be include by or affect user contacts. In some embodiments, a consumer's context (e.g., "work", "home", etc.) determine which content might be propagated to the consumer via the edition's rules. When an in "work" context, an associated content from co-workers linked to the "work" context might take priority over non-work related items. When in a "home" context, associated content for an edition might preferentially originate from family members. Alternatively, a consumer's list of active contacts could also affect selection of one or more active contexts. As a consumer interacts with or is in proximity to co-works, then selection of the "work" context as an active context might be up-weighted for example. Among the numerous advantages of such approach, one technical advantage includes prioritizing usage of network bandwidth (or conserving network bandwidth) as editions, original works, associated, work or other units of content are sent to and from a consumer based on contact-based contexts.

The context engine 232, when executed by the processor 204, may enable the user device 120 to determine a current context via one or more sensors associated with a user and/or associated with content captured by a user with their user device 120. For instance, the context engine 232 may be configured to determine a location of the user device 120 when content is generated (e.g., when a picture is captured at the user device 120, when a comment is posted to a server, when a link is forwarded to one or more people, etc.), determine a mood or sentiment of the user when content is generated, determine a location of the user device 120 when content is uploaded to the digital media management server 108, determine an availability of a user to view new content from the digital media management server 108, determine an environment around the user device 120 (e.g., whether the user is currently at home or at work), determine a network with which the user device 120 is currently connected (e.g., a home WiFi network, a work network, an unrecognized network, a cellular network, etc.). Depending upon information determined by the context engine 232, the behavior of the digital media application 228 may be modified. Likewise, one or more different attributes may be assigned to content or an object contained within content based on a context determined by the context engine. These one or more context-based attributes may be stored with the content at the digital media management server 108 within one or more different attribute spaces. In some embodiments, the context attributes can adhere to a common namespace, taxonomy, ontology or other attribute space as used to generate the attribute value pairs associated with the content. The consumer-based attributes could be part of an edition's namespace (i.e., a sub namespace), or could be a separate namespace. Such an approach is advantageous because one can use the context attributes to form a query that can be submitted to a content management server. The sever can then return a result set comprising content having attribute-value pairs that satisfy the context-based query.

In more complex embodiments contexts can form a chain of contexts where contexts can be organized in a graph data structure, possibly a directed graph. For example, a chain of contexts might reflect the state of a consumer during points of time during the day. The chain of contexts representing a consumer's day might correspond to the following contexts: "sleeping", "eating.Breakfast", "commuting.ToWork", "working", "eating.Lunch", "working", "commuting.ToHome", "eating.Dinner", and then back to "sleeping". Note this particular chain is cyclic and might only be relevant during weekdays. Further, the contexts' names can adhere to a namespace or ontology, thus a context name could be an attribute or a value of an attribute. Each individual context can be determined based on sensed data including one or more of time, location, movement, demographics, health status, environmental factors, weather conditions, or other attributes related to the consumer. Thus, the rules of the edition can also be triggered by an expected next (or unexpected) context transition. Example techniques that could be adapted for tracking contexts are described in U.S. Pat. No. 10,346,753 titled "Intent Engines, Systems and Methods" filed on Oct. 28, 2014.

While attributes are useful for consumer contexts and editions, one should recall the attributes and their corresponding namespaces are useful in the management of original content and associated content with respect to an edition. The attribute tagging instruction set 240 may correspond to a sub-routine of the digital media application 228, but such a configuration is not required. In some embodiments, the attribute tagging instruction set 240 is configured to tag content with one or more attributes and/or attribute-value pairs associated with the original digital content when transmitting to or managing such content by the digital media management server 108. The attribute tagging instruction set 240 may be configured to tag content with attributes and/or attribute-value pairs based on user-defined attributes and/or attribute-value pairs, based on context-based attributes determined with the context engine 232, and based on any other information that can be considered an attribute of the content or an object contained within the content. In more preferred embodiments as discussed previously, the attributes can confirm to one or more a prior defined namespace as discussed previously. As used herein, the content may correspond to a data structure (e.g., a media file, image file, text file, text string, message file, an article comment, a product review, a video file, an audio file, etc.) used to deliver information over the communication network 104. An object contained within content may correspond to or represent a physical item, person, or thing that is represented by the data structure of the content. Non-limiting examples of an object contained within content include an image of a link to an article, a comment, an image of an event, an image of a location, audio of a speaking person, audio of an event, a video of an event, a video of a person, a video of a thing, etc. As will be discussed in further detail herein, an object contained within content may have one or more attributes and/or attribute-value pairs associated therewith. The attribute and/or attribute-value pairs of an object contained within content may be stored within the content as metadata by the attribute tagging instructions 240, thereby enabling the user device 120 to communicate the attributes and/or attribute-value pairs for objects and/or content to the digital media management server 108 to allow linking of associated content with the original digital work being referenced or being original digital work.

Based on the above discussion regarding tagging object with attributes, one should appreciate the attributes associated with a unit of content can also be hierarchical where the unit of content itself has sub-portions. Consider a newspaper article that represents a unit of content as an original work. The article can include attributes at the article level while individual sub-portions (e.g., text, paragraphs, embedded images, embedded videos, audio clips, etc.) can also include attributes at their level, possibly governed based on the scoping rules previously mentioned.

The network interface 208 provides hardware and drivers that enable the user device 120 to connect with the network 104, receive communications from the network 104, and/or provide communications to the network 104 for delivery to another communication device (e.g., the digital media management server 108 and/or another user device 120). In some embodiments, the network interface 208 includes a wired and/or wireless network adapter. Non-limiting examples of a network interface 208 include an antenna and associated driver (e.g., a WiFi or 802.11N antenna and/or driver), an Ethernet card and/or driver, a serial data port (e.g., a USB port) and/or driver, a Bluetooth or BLE antenna and/or driver, an NFC antenna and/or driver, or any other type of device that facilitates inter-device communications. The network interface 208 may receive one or more data packets or messages from the communication network 104 and extract data therefrom. The data extracted from the received data packets or messages may be provided to the processor 204 where the data can subsequently be processed using instructions stored in memory 220. The network interface 208 may also include components that enable cellular communications between the user device 120 and components of a cellular network.

The power supply 212 may correspond to an internal power source and/or adapter for connection with an external power source. In the example of an internal power source, the power supply 212 may correspond to a battery or cell of batteries used to power the various other components of the user device 120. Alternatively, or additionally, the power supply 212 may include a power converter or power conditioner that enables power received from an external source (e.g., a 120V AC power source, etc.) to be converted into useable DC power that can be supplied to the various components of the user device 120.

The user interface 216 may correspond to a user input device, a user output device, a combination user input/output device, or a number of such devices. As an example of a user input device, the user interface 216 may include sensors such as a microphone, a button, a physical switch, a camera, an accelerometer, or the like. As an example of a user output device, the user interface 216 may include a speaker, a light, a display screen, a tactile output device (e.g., a haptic feedback device), printer, or the like. As an example of a combination user input/output device, the user interface 216 may include a touch-sensitive display screen that has one or more areas thereof capable of presenting a Graphical User Interface (GUI) element and, if touched or selected by a user, recognizing that the GUI element has been selected by the user.

The token generator 244, such as the one described in further detail in U.S. provisional application 62/856,917 and in corresponding co-owned utility application Ser. No. 16/891,364, may be configured to generate authentication tokens and work tokens for original digital works and/or associated content to original digital work created by a user of a user device 120. Digital authentication tokens or work tokens generated by the token generator 244 may be transmitted to be stored original digital work database 112 (e.g., original digital work 310, as shown in FIGS. 3 and 4), in associated content to digital works 116 (e.g., associated content 320, 330, 340, and 350, as shown in FIGS. 3 and 4), and/or attribute-value pairs objects (e.g., attribute-value pairs object 315, 325, 335, 345, and 355, as shown in FIGS. 3 and 4). Digital authentication tokens may provide an integrity check or digital signature to allow a user to verify the source of the original digital work and/or associate content (e.g., the article was original published by Reuters, etc.). As mentioned previously, such tokens can be generated in a hierarchical nature where an edition level token can be generated from lower level tokens. For example, a lower level token can be used as a possible input to the generation of the higher level token. In some embodiments, the token generator 244 is the token generator 160 of the digital media management server 108.

During an edition's lifetime, associated content can be bound to original digital work according to one or more rules of the edition. The associated content might be updates (e.g., new information from the author of an article, a comment from a user or consumer, etc.), new advertisements, related articles linked via URL, social media shares, or other types of content linked to the original digital work that was not necessarily present when the edition was published. The associated content can be linked directly or indirectly with the original digital work.

Associated content can be linked directly to the original digital work through various techniques. In general, a direct link represents zero or one level of connection. A zero-level connection example would include comments on an article where the comment (i.e., the associated content) is available as part of the article itself (i.e., the original digital work), typically located at a bottom of a page. A one-level connection would be a direct association through a direct pointer (e.g., a URL, a hyperlink, a file link, etc.) where a single interaction by the consumer (e.g., a single click on the link, a single key press, etc.) provides access to the associated content. Such a link can be uni-directional (e.g., from the original digital work to the associated content, from the associated content back to the original digital work, etc.) or bi-directional where both units of content point to each other via links or other pointers.

Associated content can also be bound to the original content indirectly through various techniques. Indirect linking can be considered a bridge between units of content where there is one or more intermediary (i.e., two or more links) objects between the units of content. For example, two units of content might be commonly referenced via a shared social network post while the two units of content do not directly link to each other. One should appreciate that direct and indirect linking are not necessarily exclusive of each other. It is contemplated that associated content can be both directly linked (e.g., via a URL, etc.) and can be indirectly linked (e.g., via a social media post, citations in a paper, etc.).

Of particular interest is associated content can be bound to original digital work via objects that characterize the content where such characterization objects can exist as separately manageable objects from their content. Such characterization objects include information about the objects they represent. More specifically, the characterization information can include a collection of attribute-value pairs describing the nature of the object, at least according to one or more well defined namespaces as discussed previously. However, the characterization object can further include metadata that is not necessarily part of the namespace, perhaps information such as a unique identifier for the characterization object or a timestamp when the characterization object was instantiated or update. Still, one should note that such information could easily be part of the namespace. Further, the attribute-value pairs can include various values that include the results of executing implementations of recognition algorithms on the content as discussed further with respect to FIG. 4.

The characterization objects can form an indirect bridge between associated content and the original digital works. One advantage of this type of bridging is each unit of content can be processed once to derive features according to the namespaces associated with the addition without the need to recalculated such features. Further, the overarching network or web of interconnected content provides an indication of how such content linked. Said a different way, by linking through such characterization objects, the link among characterization objects explicitly shows that the two characterization objects are considered bound, rather than merely the content be linked, to each other thereby providing a solid foundation for developing machine learning training datasets as discussed above. While each unit of content can be processed once, as mentioned previously, it is possible for the content to be processed again when suitable conditions are met; the namespace changes, the content changes, time has passed, etc.

With reference now to FIG. 3, a block diagram 300 illustrates the linking of original digital work 310 to associated content in accordance with at least some embodiments of the present disclosure. The block diagram 300 depicts a linked list of original digital work linked to associated content using a linked list of attribute-value pair objects. The term "linked list" is used euphuistically to represent binding associated content with original content 310. Other bindings could include a true linked list, a bi-directional linked list, a tree structure, a graph structure, a network graph, directed graphs, directed acyclic graphs, or other forms of linking data structures together. In some embodiments, the association between the original digital works and associated content may be stored in one or more databases (e.g., original digital works database 112, associated content to digital works database 116, and/or other storage medium). Rather than using a linked list structure to retrieve content, a query language associated with the database may be used (e.g., SQL, keywords, etc.). Alternatively, the links between original digital works and associated content may be stored in a map and a mapping engine may be used to store and retrieve content.

Original digital work 310 may be stored in original digital works database 112, on social media server 128, publisher server 132, and/or other server. Original digital work 310 may be accessed through digital media management server 108 to build or generate an edition. A user may create original digital work 310 and post/publish the original digital work 310 or access an edition using a user device 120. Additionally, a publisher may publish original digital work 310 using one or more publisher servers 132.

As associated content related to the original digital work 310 is created or is made knows to the system (e.g., associated content objects 320, 330, 340, 350), the associated content may be linked to the original digital work 310 via a set of attribute-value pairs objects (e.g., attribute-value pairs objects 315, 325, 335, 345, and 355). In this example, each original work and each associated content object is linked to other objects via one or more attribute-value pairs object that can be considered as providing a bridge from the original work content to the linked associated objects. For example, attribute-value pairs object 315 indirectly links the original digital work 310 (e.g., an article) to attribute-value pairs object 325, 355 illustrating that the associated content 320, 350 directly relate to the original digital work 310 (e.g., two comments related to the article, etc.).

Continuing with the example, the associated content object 330 may represent a user forwarding or sharing a link to the comment stored as the content of associated content object 320 using a user device 120. The associated content object 340 may be a response to the link forwarded in associated content object 320. As can be seen, the original digital work 310 may have one or more linked lists of associated content. Some associated content may be aggregated and stored in one or more associated content objects. For example, a link to the original digital work 310 may be forwarded multiple times, and the number of times the link was forwarded may be aggregated into an associated content object comprising a count attribute equal to the number of times the link was forwarded. The digital media management server 108, the user device 120, the social media server 128, the publisher server 132, and/or other server may perform the aggregation. For example, the content management instructions 156 of the digital media management server 108 may perform aggregation, as described in FIG. 1.

Each link can also comprise information or metadata based on the nature of the link. As discussed above the link could result from actions of a consumer or other user (e.g., editor, publisher, advertiser, game player, etc.). Such actions (e.g., sharing, commenting, correcting, etc.) can be chronicled in the link's metadata. Further, the link might be created according to the rules of the edition, which might indicate that the associated content is similar or related to the original digital work via execution of one or more implementations of recognition algorithms. Thus, the link metadata could include the reason for the automatic linking (e.g., one or more similarity scores, reason for linking, etc.). The link metadata could be stored as a separate link object. However, it is also contemplated and more preferable that the link metadata be included the attribute-value pair objects. Further, the link metadata could also be represented within or according to an edition's well-defined namespace.

FIG. 3 shows one attribute-value pair object per unit of content in order to illustrate that each unit of content can be individually characterized and then linked via their characterizations. However, it also contemplated that more than one unit of content can be associated with a single attribute-value pair object. In such embodiments, the attribute-value pair object can be instantiated to comprise the common features or intersection of attribute-value pairs that indicate the reason for linking the unit of content together.

With reference now to FIG. 4, a detailed block diagram 400 of linking original digital work 310 to associated content in accordance with at least some embodiments of the present disclosure. The detailed block diagram 400 illustrates a subset of the objects that are shown in the block diagram 300, as shown in FIG. 3. Specifically, detailed block diagram 400 illustrates the linking between original digital work 310 and associated content object 350 via two attribute-value pairs objects 315, 355. The attribute-value pair object 315 contains similar features as attribute-value pair object 355 that are not shown. One advantage of linking content via their respective attribute-value pair objects is that the devices in the system have a much more fine grain control over the links. Rather than links between content being binary (i.e., a link exists or does not exist), the attribute-value pair objects provide a detailed representation of why the two units of content are linked in the first place. Devices in the system can then take action as a function of the specific attribute-value pairs of one, two, or more units of content. Further, when such a link is established, the two attribute-value pair objects can be compared or contrasted with each other, or otherwise analyzed to better understand the relationship among the linked content. Thus, this approach is advantageous because it provides a solid data foundation for unsupervised learning.

The original digital work 310 can include numerous features (e.g., inherent features, derivable features, metadata, etc.) that aid in management of the original digital work 310 and provide a method to link to or with associated content. In some more preferred embodiments, the original digital work 310 can comprise one or more attributes that describe the nature of the original digital work 310 where at least some attributes can or preferably conform to the edition's well-define namespace. Example attributes can include the digital content of the original digital work 310 (e.g., text, image(s), audio, link(s), photographs, keywords, hashtags, and/or the like). The original digital work 310 also contains features to link to attribute-value pair objects (e.g., the attribute-values pairs object pointer(s), etc.). An authentication token may also be incorporated into the original digital work 310 to demonstrate that the content has not be modified. Additional features may be incorporated into the original digital work 310 and/or incorporated into an attribute-value pair object.

The associated content object 350 can include numerous features that aid in management of the associated content objects and provide a method to link associated content to original digital work and/or one or more other associated content objects via attribute-value pairs objects. In some more preferred embodiments, the associated content object 350 can include one or more attributes that describe the nature of the associated content object 350 and that can also adhere to the edition's namespace. However, it is also possible that associated content could be externally or separately generated from the edition by a third party (e.g., an advertiser, social media influencer, etc.). Therefore, the attributes of associated content 350 might need to be generated by the user's device or one of the servers in the ecosystem. Example attributes can include the digital content of the associated content object 350 (e.g., comments(s), text, image(s), audio, link(s), video, and/or the like). The associated content object 350 also contains features to link to one or more of attribute-values pairs objects (e.g., the attribute-values pairs object pointer(s)). A work token may also be incorporated into the associated content object 350 to identify the content or an authentication token may be incorporated to demonstrate that the content has not be modified if the work token cannot be reproduced. Additional features may be incorporated into the associated content object 350 and/or incorporated into an attribute-value pair object.

The attribute-value pairs object 355 can include numerous features that aid in management of attribute-value pairs objects and provide a method to link one or more associated content to one or more original digital work and/or one or more other associated content objects via attribute-value pairs objects. The attribute-value pairs object 355 can include an attribute ID (e.g., a unique attribute identifier), other identifiers, such as an owner ID, a publisher ID, and a creator ID (e.g., username, key, token, etc.), type ID (e.g., aggregated content, type of content stored in the linked associated content object or original digital work), one or more timestamps that may be used to create a timeline, a time-to-live value (e.g., used to limit the lifetime of the referenced object), a GUID for unique identification, a work token (e.g., work or authentication token associated with the attribute-value pairs object), contexts, shared social media platforms, similarity measures or metrics, other metadata, pointers or references to other objects (e.g., associated content pointer(s) linking to associated content objects, attribute-value pairs object pointers, original digital work pointer(s), event object pointer(s), etc.).

Figure 5:
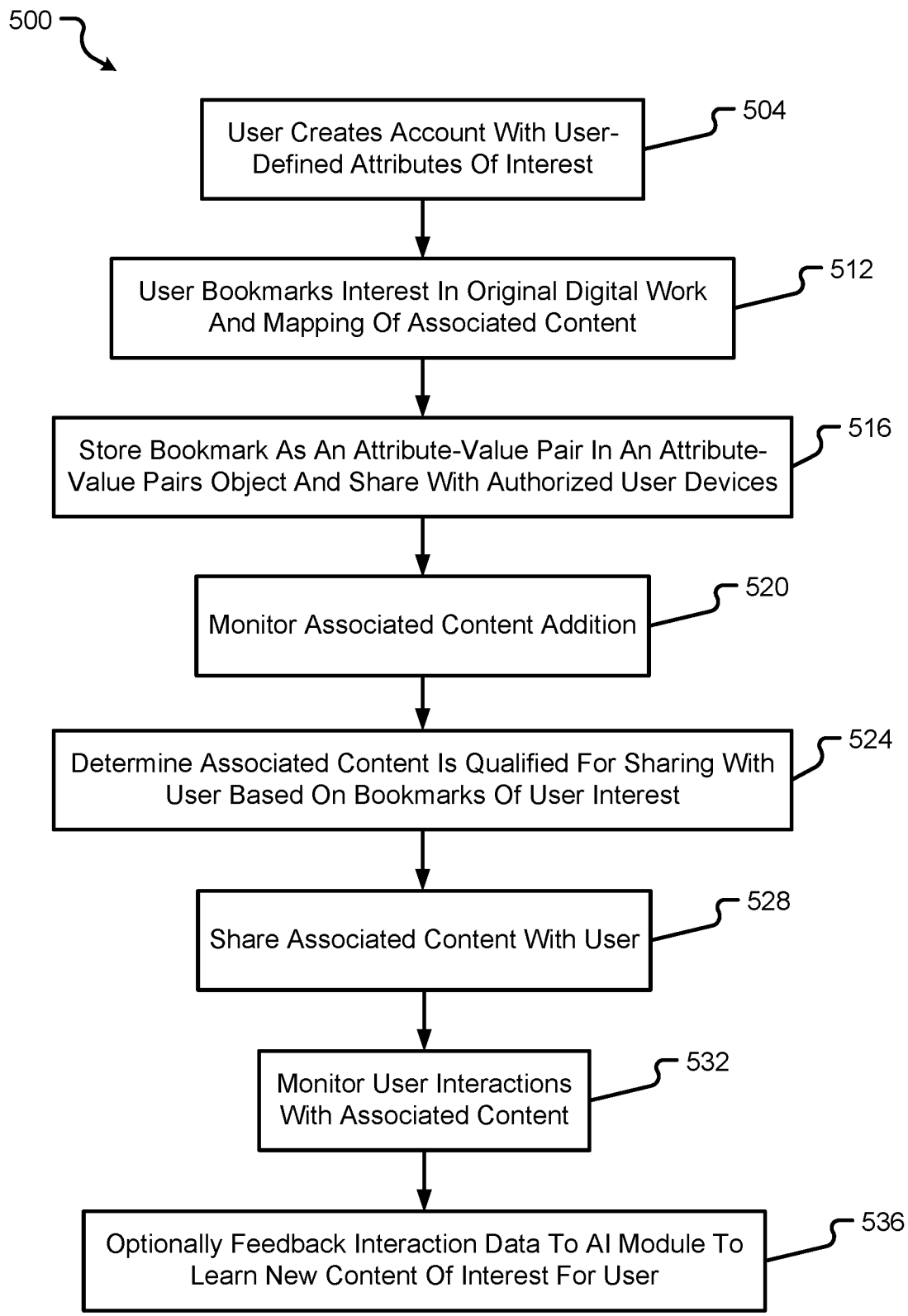
FIG. 5 is a flow chart depicting a content sharing method in accordance with at least some embodiments of the present disclosure.
Figure 6:
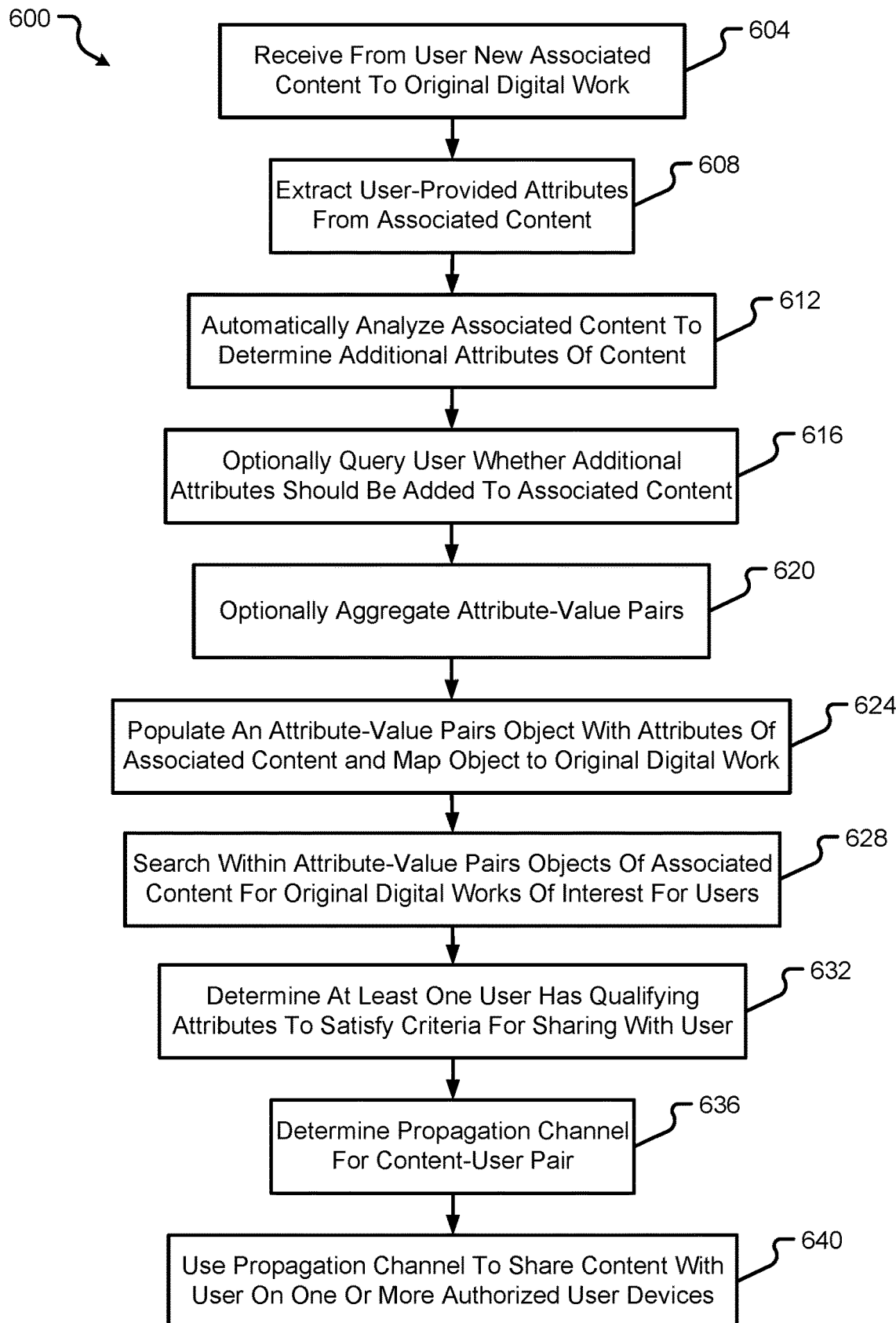
FIG. 6 is a flow chart depicting a propagation channel selection method in accordance with at least some embodiments of the present disclosure.
Figure 7:
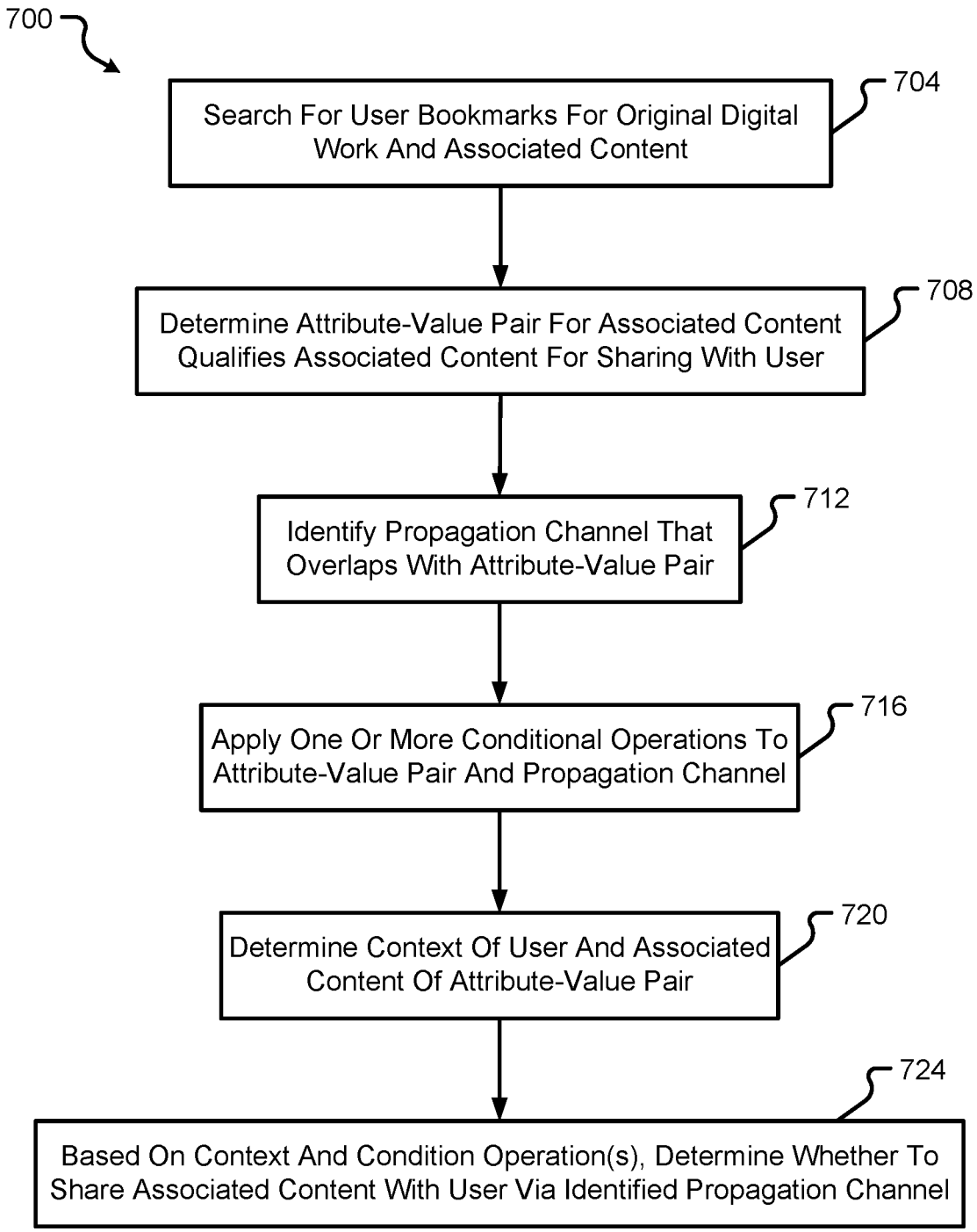
FIG. 7 is a flow chart depicting another content sharing method in accordance with at least some embodiments of the present disclosure.

The attribute-value pairs object 355 can further including index information representing one or more sets of recognizable features (e.g., memento objects as discussed in U.S. Pat. No. 10,133,742, etc.). The indexing information can include various acceptance recognition criteria defined as a function for recognition features where the criteria indicate satisfaction conditions or requirements that may be optional or should be met to access corresponding associate content objects and original digital works. Recognizable features may include SIFT, FAST, SURF, edges, VIPR, OCR features, Natural Language Processing features, and/or the like. Additional features may include size, shape, dimensions, color, bar codes, QR codes, encoded data, non-encoded data, descriptors, font, color histogram, or other attributes that can be including a namespace. The indexing information may allow unassociated content to be associated with original digital works and/or associated content related to an original digital work. With reference now to FIGS. 5-7, various methods of operating the system 100 or components therein will be described. It should be appreciated that any of the following methods may be performed in part or in total by any of the components depicted and described in connection with FIGS. 1-4.

Referring initially to FIG. 5, a content sharing method 500 will be described in accordance with at least some embodiments of the present disclosure. The method begins when a user creates a user account with the digital media management server 108 (step 504), possibly as subscriber to an eNewsPaper. As a user views content on a user device 120, a user may bookmark interest in original digital work and interest in associated content of the original digital work (step 512). The bookmarks may be used by the content management instructions 156 to track the creation of new associated content by the user. Additionally, or alternatively, the content management instructions 156 may use recognition features associated with an object of interest to identify the association between the original content and the new associated content. A portion or all of the functionality of the content sharing method 500 may be performed by or coordinated with the digital media application 228 executing on a user device 120. One should appreciate that while the disclosure uses an eNewsPaper as an example, the disclosed techniques are applicable of other forms of content; for example, social media, video game content, streaming services, technical manuals, 3D animation, demonstrations, simulations, lectures, student courses, or other forms of content.

Interestingly, because editions or each unit of content each have corresponding attribute-value pair objects and each consumer is able to have one or more active contexts, it is possible for a consumer, or other user, to define a very specific, fine-grained subscription model that governs content made available to the consumer. In some embodiments, an edition can include rules that define which original digital works are required parts of the edition, which original digital works could be optional, or which digital works can be the subject of one or more subscription models. While such an embodiment is relevant to an eNewsPaper, it is also contemplated that a consumer could simply define subscription criteria for any unit of content (e.g., social media posts, web posts, pod casts, videos, vlogs, streaming services, etc.). The subscription models can include criteria that should be satisfied by the attribute-value pair objects of a unit of content in order for the unit of content to be presented to the consumer. Such an approach provides for very fined-grained, dynamic subscriptions because the user (e.g., editor, publisher, consumer, etc.) are able define, with high fidelity, the requirements or optional conditions as a function of the specific values in the attribute-value pair objects, which permits the consumer in some embodiments to create their own edition if desired. The subscription content can be provided to the user via a push to the rendering app, via a pull by the rendering app, or other technique. In the case of a server-centric (e.g., digital media management server, social media server, publisher server, etc.) model, the server can include one or more listeners or agents that compare a unit of content's attribute-value pair object with a subscription criteria. If the subscription criteria is satisfied by the values in the attribute-value pair object, the server then triggers sending or transmission of information associated with the unit of content (e.g., content itself, link, advertisements, etc.). Still further, a collection of attribute-values could be used to define or identify a specific subscription channel through which content can be propagated. For example, U.S. Pat. No. 9,860,601 titled "Visual Hash Tags via Trending Recognition Activities, Systems and Methods" filed Nov. 28, 2016, describes mapping image descriptors to channels. These techniques could be adapted to the disclosed techniques by mapping attribute-value pairs to channel identifiers.

The method may continue with the content management instructions 156 storing the user bookmarks as an attribute-value pair in an attribute-value pairs object and linking the attribute-value pairs object to the original digital work (step 516). The bookmarks may be shared with other user devices 120 authorized to receive the bookmarks. Sharing bookmarks between devices allows a user to view the same original content and/or associate content among one or more devices. For example, a user may view an article on a smartphone and then switch to a laptop computer to continue reading the article. Thus, the disclosed techniques provide for a consumer or other user to maintain their individual state relative to the edition or content they are viewing on any suitably enabled devices. This approach provides for a seamless experience as the user shifts from device to device (e.g., PC to smart phone, smart phone to smart TV, etc.).

The method may continue with the content management instructions 156 monitoring the addition of associated content and objects contained within content at the digital media management server 108 (step 520). In particular, as users upload content to the digital media management server 108 and the content is stored in memory 152 or in a database made accessible to the digital media management server 108 (e.g., original digital work database 112 and/or associated content to digital works database 116), the content management instructions 156, in cooperation with the database management instructions 172, may monitor the addition of associated content and new original digital works. This may occur during creation or publishing of an edition, or through the lifetime of an edition. In some embodiments, an edition or original content might be at the end of its active lifetime. In which case, such units of content could be locked down to prevent further links to or binding of associated content.

The method may continue with the content management instructions 156 determining that associated content is qualified for sharing with a user based on stored bookmarks showing user interest in the original digital work and/or associated content for the original digital work (step 524). The content management instructions 156 may share the associated content with the user via a user device 120 (step 528). The propagation channel management engine 164 may be leveraged to share the content with the user. The content management instructions 156 may then monitor user interactions with the associated content and may bookmark additional interests (step 532). Thus, as associated content is linked to an original digital work (e.g., linked by other consumers, automatically found via devices in the ecosystem, found via a crawler, etc.), one or more rules of an edition related to the original digital work may be trigger, which causes the user to be notified. One should be appreciated that rules governing such notification behavior can operate based on the contents' corresponding attribute-value pair objects. When the values or presence of attributes in the attribute-value object satisfy the notification rule triggering requirements, propagation channel management engine 164 can transmit the notification to the user.

As content is shared with the user by the digital media management server 108, the user's interactions with the content (e.g., clicks to links in the content, viewing activity, listening activity, interaction stream, click stream, engagement points, etc.) may be monitored by the digital media management server 108 (step 536) and optionally provided as feedback data to the AI module 176 to enable the AI module 176 to learn new associated content and original digital works of interest for the user. In some embodiments, the AI module 176, in response to discovering a new possible content of interest for a user, may cause the digital media management server 108 to submit one or more queries to the user asking if they would like the new content to be bookmarked. Such information provides a continuously grown dataset that can be leveraged for machine learning or data analysis purposes.

With reference now to FIG. 6, a propagation channel selection method 600 will be described in accordance with at least some embodiments of the present disclosure. Method 600 can be considered an embodiment where a consumer interacts with a published edition and its original digital content. The method begins when new associated content is received from a user or is otherwise generated and, in particular, from a user device 120 (step 604). Upon receiving new associated content, the content management instructions 156 may be used to extract user-provided attributes, derived attributes, and associated content (step 608). In some embodiments, the attributes or associated content may be provided as data within the content by the content management instructions 156.

After, during, or before, the user-defined attributes and associated content have been extracted, the method may further continue with the content management instructions 156 automatically analyzing the content to determine if additional attributes can be defined for the associated content or an object contained within the content (step 612). For example, in some embodiments, one or more implementations recognition or data analysis algorithms can be executed using the content as input. The derived features can then be including with the attributes of the content. In some embodiments, the content management instructions 156 may enable the digital media management server 108 to query the user about whether any automatically-discovered attributes or reference to the original digital work should be added to the associated content, or possibly added to the namespace. In some embodiments, the query may be provided to the user via a communication channel established with the user device 120 and the digital media application 228 may cause the query to be presented to the user via the user interface 216. Optionally, attribute-value pairs may be aggregated (step 620). For example, when a link to an original digital work is forwarded multiple times, the attribute-value pair for the associated content may include the number of times the link was forwarded rather than linking an attribute-value pair for each forwarding of the link.

The method may then continue with the content management instructions 156 populating an attribute-value pairs object or otherwise instantiating a corresponding attribute-value pair object (e.g., attribute-value pairs objects 315, 325, 335, 345, and 355, as shown in FIGS. 3 and 4) with attributes or associated content for original digital works of interest for the users (step 624). The method may then search within the attribute-value pairs objects of associated content for original digital works of interest for one or more users (step 628).

The method may further continue if/when the content management instructions 156 discovers at least one user has qualifying attributes (e.g., bookmarks, values, features, etc.) that satisfies the search criteria for sharing with the user (step 632). The content management instructions 156 may then invoke the propagation channel management engine 164 to determine which and how many propagation channels should be used to communicate the newly-added content to the user associated with the qualifying attributes satisfying the search criteria. In some embodiments, the propagation channel(s) selected for use in distributing the content may correspond to those propagation channel(s) that at least overlap one point or area used to determine that the distribution should occur (step 636). The propagation channel management engine 164 may then allocate the appropriate media resources of the digital media management server 108 to transmit the content to the user device 120 being used by the user that was associated with the attribute or associated content that satisfied the search criteria in step 628 (step 640). In some embodiments, the content is shared with the user via the digital media application 228 and/or by some other communication method defined by the selected propagation channel.

With reference now to FIG. 7, another content sharing method 700 will be described in accordance with at least some embodiments of the present disclosure. The method begins when content management instructions 156 searches for user bookmarks for original digital work and associated content (step 704). The content management instructions 156 may determine that attribute-value pair for associated content qualifies associated content for sharing with one or more users (step 708). Thereafter, a propagation channel is identified as overlapping with the attribute-value pair that resulted in the qualification determination of step 708 (step 612).

The method may further continue with the content management instructions 156 applying one or more conditional operations to the attribute-value pair and the propagation channel to determine if distribution of the content to the user via the propagation channel should still be affected (step 716). As some examples, the content management instructions 156 may apply one or more of an AND, OR, NOR, NOT, XOR, IF—THEN-ELSE, operation to the attribute-value pairs used in the qualification determination of step 708 (step 716), which can be part of the rules governing the behavior of the edition.

The method may further include the content management instructions 156 checking any contextual information that can be determined for the user that uploaded or interactions with the content and/or a context of a user that is set to receive the content from the digital media management server 108 (step 720). In some embodiments, the content management instructions 156 may query the digital media application 228 of the candidate recipient's user device 120 to request at least some context information (e.g., location, sensor data, time, demographic information, etc.). The digital media application 228 may be configured to respond to the request by invoking the context engine 232 and determining a context of the candidate recipient. This contextual information may be provided back to the digital media management server 108 where the content management instructions 156 may determine whether to share the content with the user via the identified propagation channel (step 724). In this step, the content management instructions 156 may check the results of the condition application as well as the contextual information to determine if the candidate recipient user should have the content transmitted thereto, possibly according to the rules of the corresponding edition.

Figure 8:
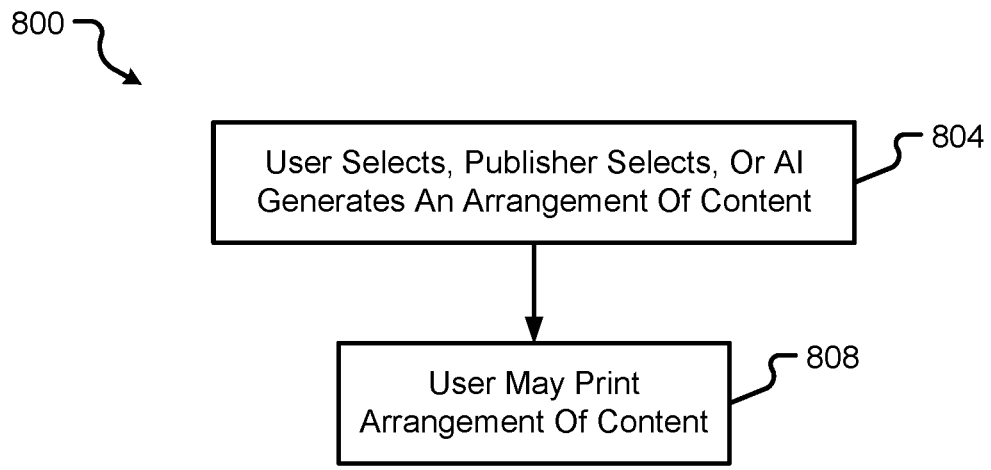
FIG. 8 is a flow chart depicting a method of curating content in accordance with at least some embodiments of the present disclosure.

With reference now to FIG. 8, a curating content method will be described in accordance with at least some embodiments of the present disclosure. The method begins with a user selecting, a publisher selecting, and/or an AI (e.g., AI module 176) an arrangement of content for curation (step 804), possibly as part of an edition. Once content is curated, the user may print (e.g., via user printer 124, as shown in FIG. 1) the arrangement of content (step 808). In some embodiments, the user or consumer can program or select when the content should be printed. For example, for a morning edition of an eNewsPaper, the consumer can provide instructions to print all or selected portions of the edition on their local printer, which enables the consumer to read the morning eNewsPaper during a morning coffee.

Figure 9:
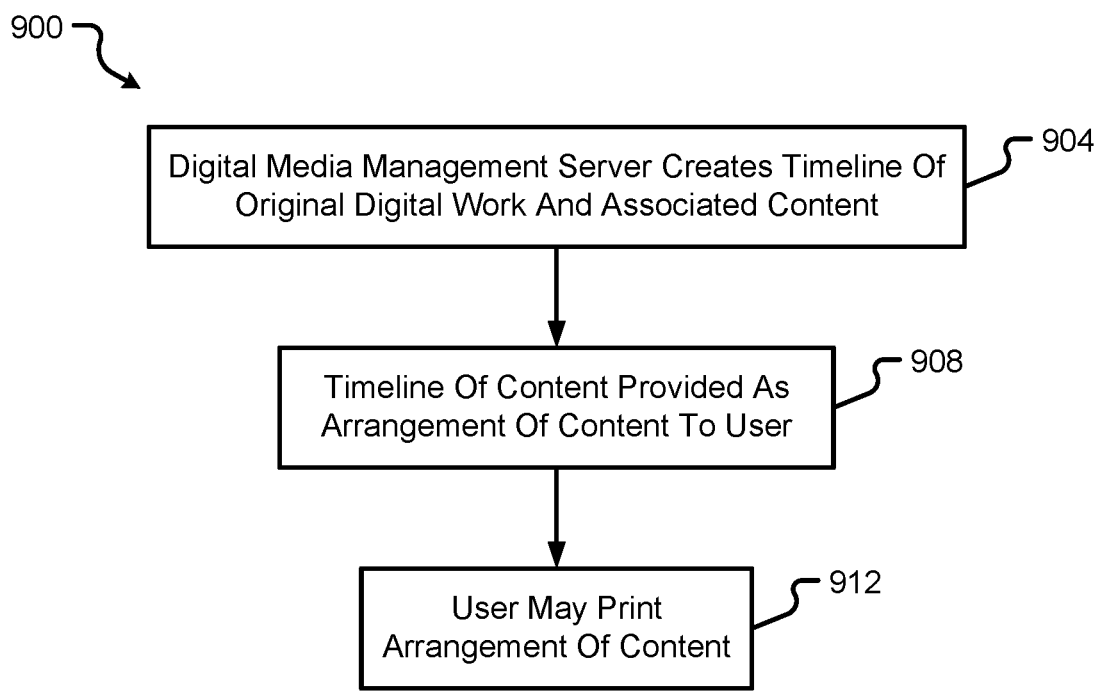
FIG. 9 is a flow chart depicting a method of creating a timeline of original digital work and associated content in accordance with at least some embodiments of the present.

With reference now to FIG. 9, a method of creating a timeline of original digital work and associated content method will be described in accordance with at least some embodiments of the present disclosure. The method begins with the archive engine 168 of the digital media management server 108 creating a timeline of the original digital work and associated content of the original digital work (step 904), as described above. The archive engine 168 can also bind the content to a timeline associated with the original digital work where the timeline represents multiple associated content organized by time. The archive engine 168 can link the associated content with the original digital work by mapping one or more recognizable features, possibly via intermediary indexing information, of the associated content to the selected original digital work. The archive engine 168 is capable of retrieving the selected associated content through deriving one or more derived features from a digital representation of the content and using the derived features as basis to search for the selected original digital work. The archive engine 168 can recognize the references and/or links to original digital works and associated content or recently received content by the digital media management server 108, and determine if the recently received content is an original digital work having its own timeline and/or associated content linked to another timeline. If so, assuming authorization to link, then the archiving engine 168 can link or bind the content to one or more timelines.

The timeline of content may be provided as an arrangement of content to the user via a user device 120 (step 908). Once content is curated, the user may print (e.g., via user printer 124, as shown in FIG. 1) the arrangement of content (step 912).

It should be appreciated that any combination of authentication processes depicted and described herein can be performed without departing from the scope of the present disclosure. Alternatively, or additionally, any number of other authentication processes can be developed by combining various portions or sub-steps of the described authentication processes without departing from the scope of the present disclosure.

Specific details were given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Based on the discussion above regarding various aspects or embodiments, there are numerous additional considerations that should be further appreciated.

Consider a scenario where unit of content, whether original content or associated content, states a dubiously asserted fact. Often readers of news feeds, social media, or other published forms of content have difficulty determining if the asserted fact is true, misleading, or false. At the time of this writing, simply stating an article is "fake news" does a great deal of damage regardless of any evidence that the article is true. Thus, there is a need for additional tools for fact checking of some form. Therefore, the disclosed techniques can be adapted for use in combating falsehoods, misinformation, or improper assertions of fake news. The attribute namespace for an edition or units of content can include one or more validity scores that represent the credibility of the content or the statements made in the content. Factors that contribute to the validity score can include the credibility of the source, the reputation of the source, number or quality of supporting citations, lack of circular citations (e.g., citations that cite other articles that then cite back to the original), or other factors. Each factor can be quantified or normalized as desired. For example, score values (e.g., reputation, credibility, etc.) could be given a normalized value between 0.0 (not reputable or credible) to 1.0 (completely reputable or credible); other scales can also be used with without departing from the inventive subject matter. Other factors can include counts; number of citations supporting assertions for example. A final validity score could be the product of all three factors: validity score=(credibility score)×(reputation score)×(number of citations). Although this particular validity score model is open-ended in the sense it can grow without bound, it can be further adjusted by accounting for the weight of the number of citations by taken a $\log_{10}$ of the number of citations value or $\log_{10}$ of the product. Once a validity score is calculated, it can be published with the unit of content so that consumers can see how the content is measured. These measures can be rendered for the consumer according to the rules of the corresponding edition. Note that the values of the validity score could change as information is gathered by supporting evidence; for example, new citations become available or a contributor's credibility increases. Thus, such validity scores can be dynamic where they change with time based on new information.

While the discussion above largely frames the inventive subject matter in the context of an eNewsPaper, it should be understood the inventive subject matter can be used for other forms of content arrangements. Similar to a newspaper, a magazine or other periodical could use these techniques to the benefit of the editors or consumers. One difference between a newspaper and a magazine would include the duration of the periodical's active lifetime. Rather than measured in hours or days, the active lifetime of a magazine edition might be weeks, months, quarters, or other longer periods. In a somewhat similar vein, catalogs could also be published using the disclosed techniques. In fact, a catalog could be created using products from Amazon, eBay, or other sources. The catalog could present the arrangement of content according to the rules of the catalog, even in real-time. As new products appear or as old products become sold out, the catalog can adapt accordingly. From a more distant perspective, other types of content arrangements can include a presentation of vital signs from a set of patients, product manuals or technical documentation, real-time dashboards of network monitoring (e.g., collected status from SNMP, OpenNMS, etc.), streaming content (e.g., live feeds, video feeds, Twitch.TV, etc.), or other forms of content arrangements.

The above disclosure describes the various embodiments as existing in the context of a user device, mainly a smart phone. The user device could be any suitably enabled computing device (e.g., personal computer, laptop, tablet computer, appliance, set top box, smart TV, etc.). Further, the various executable instructions can also be integrated into other applications rather than existing as a standalone application. More specifically, one aspect of the inventive subject matter is considered to include a widget that can be integrated into a web browser or into web-based applications such as social media applications (e.g., Facebook, Instagram, Pinterest, etc.). The widget can operate in multiple ways. The widget can comprise some aspects of an edition's rules, operating as an edition agent for example, and then observes a consumer's interactions in the social media application or the browser. When the interactions and the corresponding content satisfy one or more rules of the edition's agent, the agent can execute or cause execution of the rules. This could enable linking the edition or the edition's content to the browser associated content or could enable providing the browser content back to the edition thereby creating associated content.

As consumers engage with an edition via applications such as an eNewsPaper app, widget, or other executable code, they can generate associated content. Further, nearly anyone can create associated content at nearly any time. This implies that associated content can grow nearly without bound, which creates storage problems or other content management problems. Storage issues can be mitigated through creating pointers from original content to the associated content as desired. However, one should keep in mind that attribute-pair objects are can also be stored for each unit of content and must be managed. Therefore, in some embodiments, the amount or extent of associated content can be quenched or otherwise controlled. Thus, the edition can comprise rules that operate to quench, control, or limit content as a function of the storage attributes, amount of storage required for content (e.g., a unit of content, corresponding attribute-value pair objects, etc.), extent of links (e.g., number of hops from original content to associated content, etc.), lifetime attributes, similarity scores, or other factors. For example, associated content might be excluded from an edition if it is too distant in terms of links from the original content (e.g., 3, 4, 5, or more intermediary links, etc.) or if it is too dissimilar. The associated content can comprise a link count attribute or a similarity attribute. These numeric factors can be used to filter associated content according to one or more rules. The inverse of the number of links multiplied by a similarity score (e.g., a Euclidean distance in the attribute space, hamming distance, etc.) could be used for filtering. This approach downweights distances, but up-weights similarity. If the product of the two measures, possibly normalized, fails to satisfy a threshold value, then the associated content would be filtered.

As alluded to previously, content can be leveled to accommodate a consumer's education or understanding level based on the consumer's context. If a consumer is considered an expert in a field or topic, then the expert might receive original digital works that are for experts or a different version of the original digital content that has been drafted according to the specific expertise. Further, such content might direct the expert consumer to additional information (i.e., associated content) such as published research papers. Non-expert consumers might receive a watered down version of the content or might be directed to associated content containing term definitions or Wikipedia articles where the non-expert consumer can learn more about the basics of the topic. In some embodiments, edition rules can include rules for management of terms or phrases within a unit of content. Consider a case where an article contains information that might span a spectrum of complexity from non-expert to expert information. The rules can govern how terms, or rather synonyms of terms, are rendered to the consumer based on the consumer's context. For example, an article or story about a patient having a brain tumor might reference the patient's condition in different ways according to the expertise, where the rendered text is determined by using the expertise of the consumer as an index into a synonym database, possibly as follows:

If (Context.Education=="HighSchool"), then term="brain cancer";
If (Context.Education=="College"), then term="glioma";
If (Context.Profession=="Oncologist"), then term="gliomatosis cerebri".

While an edition can include original digital works such as puzzles or games (e.g., crossword puzzles, Sudoku, word searches, etc.), the disclosed inventive subject matters gives rise to new types of entertainments. The original digital works can include interactive puzzles or games, possibly as a retro game (e.g., PacMan, Space Invaders, etc.) that run within a virtual machine on the user devices and according to rules of the edition. Further, in view that many consumers are able to subscribe to an edition, multiple consumers can cooperate or compete with other with respect to such puzzles or games. One should keep in mind that such interactive original digital works are also subject to the rules of the edition or the lifetime of the edition. For example, an edition might have leader boards that exist only during the lifetime of the edition and consumers competing with each other might only have their names on the leader board during the lifetime of the edition. Additionally, a consumer's context also gives rise to interesting interactive puzzles or games. Games might include location-based or geo-location-based games where consumers must walk a certain distance, visit a landmark, or otherwise physically move to unlock content. Such features might be highly market relevant to a fitness section of an eNewsPaper edition or a fitness magazine. Games, puzzles, or other forms of interactive entertainment could be published as an edition. Video game having various levels or features could include a story where the story is broken down by challenges or chapters. Each chapter could be released as an individual edition with original content representing specific story points with which a consumer engages. The game chapter can include a lifetime representing how long a player might have to overcome challenges (e.g., physical challenges tracked via sensors in a smart phone or fitness sensor, location-based activities, puzzles, etc.). Such chapters or challenges can be released periodically as desired.

Editions can have additional interactive features beyond games, puzzles, or other entertainments. In some embodiments, the edition or even units of content can include rules that include executable code that enable interaction with a user (e.g., editor, publisher, consumer, advertiser, etc.). For example, as the consumer engages with the edition or units of content, the executable code can request or otherwise query a user to determine preferences, determine values of one or more attributes, request survey answers, flesh out edition or content templates, or other perform other interactions. Providing for such interactive features can aid in further refining dataset for machine learning. While, in general, attribute-value pair object provide a solid foundation for unsupervised machine learning, including support for interactivity can aid in creating supervised learning datasets by having users provide clarity with respect to the data. Additional clarity can include providing classifications for clusters, confirming preferences, or otherwise defining features in the dataset. Thus, one aspect of the inventive subject matter is considered to include crowdsourcing generation of machine learning training dataset as part of an edition, rules, or units of content. The results of the crowdsourcing datasets can be included, possibly in real-time, back into the edition or incorporated into future editions as a function of the editions rules. Example techniques that can be leveraged are described in U.S. Pat. No. 10,147,038 titled "Mechanical Turk Integrated IDE, Systems and Methods", filed Aug. 5, 2016.

What is claimed is:

1. A computer implemented method, comprising:
receiving associated content from a user device, wherein the associated content comprises an object contained therein and an association to an original digital work;
determining an attribute-value pair object for the associated content or the object contained within the content, wherein the attribute-value pair object comprises an independently manageable object that characterizes the associated content;
linking, via a pointer, the attribute-value pair object for the associated content or the object contained within the content to the original digital work using a linked list of attribute-value pair objects, wherein the linked list of attribute-value pair objects comprises a plurality of attribute-value pair objects organized with pointers in a linked list structure, and wherein the attribute-value pair objects comprise index information representing one or more recognizable features as well as attributes that adhere to a well-defined namespace;
in response to the linking, determining that the associated content is qualified for sharing;
in response to determining that the associated content is qualified for sharing, referencing one or more pointers of the linked list of attribute-value pair objects to determine that the second user is interested in the associated content;
in response to determining that the second user is interested in the associated content, causing the associated content to be published to a second user device associated with the second user having the interest in the associated content; and
recording the publication of the associated content and the attribute-value pair object on a notarized ledger.

2. The computer implemented method of claim 1, wherein the content is shared with the second user device via a propagation channel selected from among a plurality of different candidate propagation channels, wherein the well-defined namespace comprises one or more validity scores, and wherein the one or more validity scores are shared with the second user device along with the content.

3. The computer implemented method of claim 2, wherein the one or more validity scores are dynamic and wherein the propagation channel comprises at least one of a text channel, a video channel, an audio channel, and a multimedia channel.

4. The computer implemented method of claim 1, further comprising:
configuring a computing device to operate as an event archiving engine;
receiving the linked list of attribute-value pair objects, by the event archiving engine, wherein each attribute-value pair object comprises a timestamp and an associated content object; and
binding the event object, by the event archiving engine, to a timeline associated with the original digital work where the timeline comprises a plurality of associated content objects organized according to time.

5. The computer implemented method of claim 4, wherein the publication is based on a traversal of the notarized ledger and wherein the associated content object comprises at least one of the following types of data: audio data, video data, image data, motion data, acceleration data, temperature data, location data, time data, metadata, identification data, preference data, game data, and security data.

6. The computer implemented method of claim 4, wherein the step of configuring the device to operate as the event archiving engine includes accessing at least one of the following: an application program interface, a search engine interface, a social network interface, a cell phone interface, a browser interface, and a sensor interface.

7. The computer implemented method of claim 1, further comprising:
determining a user curated selection of the plurality of associated content objects organized according to time; and
printing the user curated selection of associated content objects.

8. The computer implemented method of claim 1, further comprising:
analyzing the second user's interactions with the associate content; and
based on the analysis of the second user's interactions with the associated content, automatically creating an additional attribute-value pair object for the second user within the linked list of attribute value pairs that represents another associated content and an associated attribute-value pair object.

9. The computer implemented method of claim 1, further comprising:
applying a conditional operation to the attribute-value pair object representing the associated content or object contained within the content; and
based on the application of the conditional operation, determining whether or not to transmit the content to the second user device.

10. The computer implemented method of claim 9, further comprising:
determining a context associated with the second user;
including the context as part of applying the conditional operation; and
based on the context associated with the second user, determining whether or not to transmit the content to the second user device.

11. A communication system, comprising:
a network interface;
a processor coupled with the network interface; and
memory coupled with the processor, wherein the memory comprises instructions stored thereon that are executable by the processor, wherein the instructions comprise:
an instruction set that receives associated content from a user device, wherein the associated content comprises an object contained therein;
an instruction set that determines an attribute-value pair object for the associated content or the object contained within the content, wherein the attribute-value pair object comprises an independently manageable object that characterizes the associated content;
an instruction set that links, via a pointer, the attribute-value pair object for the associated content or the object contained within the content to the original digital work using a linked list of attribute-value pair objects, wherein the linked list of attribute-value pair objects comprises a plurality of attribute-value pair objects organized with pointers in a linked list structure, and wherein the attribute-value pair objects comprise index information representing one or more recognizable features as well as attributes that adhere to a well-defined namespace;
an instruction set that, in response to the linking, determines that the associated content is qualified for sharing;

an instruction set that in response to determining that the associated content is qualified for sharing, references one or more pointers of the linked list of attribute-value pair objects to determine that the second user is interested in the associated content the attribute space for an adjacent attribute-value pair object;

an instruction set that causes, in response to determining that a second user is interested, the associated content to be published to a second user device associated with the second user having the interest in the associated content; and an instruction set that records the publication of the associated content and the attribute-value pair object on a notarized ledger.

12. The communication system of claim 11, wherein the content is shared with the second user device via a propagation channel selected from among a plurality of different candidate propagation channels, wherein the well-defined namespace comprises one or more validity scores, and wherein the one or more validity scores are shared with the second user device along with the content.

13. The communication system of claim 12, wherein the one or more validity scores are normalized and wherein the propagation channel comprises at least one of a text channel, a video channel, an audio channel, and a multimedia channel.

14. The communication system of claim 13, wherein the instructions further comprise:
   an instruction set that configure a computing device to operate as an event archiving engine;
   an instruction set that receives the linked list of attribute-value pair objects, by the event archiving engine, wherein each attribute-value pair object comprises a timestamp and an associated content object; and
   an instruction set that binds the event object, by the event archiving engine, to a timeline associated with the original digital work where the timeline comprises a plurality of associated content objects organized according to time.

15. The communication system of claim 14, wherein the publication is based on a traversal of the notarized ledger and wherein the associated content object comprises at least one of the following types of data: audio data, video data, image data, motion data, acceleration data, temperature data, location data, time data, metadata, identification data, preference data, game data, and security data.

16. The communication system of claim 14, wherein the step of configuring the device to operate as the event archiving engine includes accessing at least one of the following: an application program interface, a search engine interface, a social network interface, a cell phone interface, a browser interface, and a sensor interface.

17. The communication system of claim 11, wherein the instructions further comprise:
   an instruction set that determine a user curated selection of the plurality of associated content objects organized according to time; and
   an instruction set that print the user curated selection of associated content objects.

18. The communication system of claim 11 wherein the instructions further comprise:
   an instruction set that analyzes the second user's interactions with the associate content
   an instruction set that automatically creates, based on the analysis of the second user's interactions with the associated content, an additional attribute-value pair object for the second user within the linked list of attribute value pairs that represents another associated content and an associated attribute-value pair object.

19. The communication system of claim 11, wherein the instructions further comprise:
   an instruction set that applies a conditional operation to the attribute-value pair object representing the associated content or object contained within the content; and
   an instruction set that determines whether or not to transmit the content to the second user device based on the application of the conditional operation.

20. The communication system of claim 19, wherein the instructions further comprise:
   an instruction set that determines a context associated with the user;
   an instruction set that includes the context as part of applying the conditional operation; and
   an instruction set that, based on the context associated with the second user, determines whether or not to transmit the content to the second user device.

* * * * *